(12) United States Patent
Burger et al.

(10) Patent No.: US 11,977,891 B2
(45) Date of Patent: May 7, 2024

(54) IMPLICIT PROGRAM ORDER

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/012,674

(22) Filed: Feb. 1, 2016

(65) Prior Publication Data
US 2017/0083327 A1 Mar. 23, 2017

Related U.S. Application Data
(60) Provisional application No. 62/221,003, filed on Sep. 19, 2015.

(51) Int. Cl.
*G06F 9/30* (2018.01)
*G06F 9/26* (2006.01)
(Continued)

(52) U.S. Cl.
CPC ............ *G06F 9/3016* (2013.01); *G06F 9/268* (2013.01); *G06F 9/30007* (2013.01);
(Continued)

(58) Field of Classification Search
None
See application file for complete search history.

(56) References Cited

U.S. PATENT DOCUMENTS 5,142,631 A 8/1992 Murray et al.
5,317,734 A 5/1994 Gupta
(Continued)

FOREIGN PATENT DOCUMENTS

CN 101266558 A 9/2008
CN 101477454 A 7/2009
(Continued)

OTHER PUBLICATIONS

Sankaralingam et al., "Distributed Microarchitectural Protocols in the TRIPS Prototype Processor", Dec. 2006, Distributed microarchitectural protocols in the TRIPS prototype processor. In Microarchitecture, 2006. MICRO-39. 39th Annual IEEE/ACM International Symposium on (pp. 480-491).*
(Continued)

*Primary Examiner* — John M Lindlof
(74) *Attorney, Agent, or Firm* — Klarquist Sparkman, LLP

(57) ABSTRACT

Apparatus and methods are disclosed for controlling execution of memory access instructions in a block-based processor architecture using a hardware structure that generates a relative ordering of memory access instruction in an instruction block. In one example of the disclosed technology, a method of executing an instruction block having a plurality of memory load and/or memory store instructions includes decoding an instruction block encoding a plurality of memory access instructions and generating data indicating a relative order for executing the memory access instructions in the instruction block and scheduling operation of a portion of the instruction block based at least in part on the relative order data. In some examples, a store vector data register can store the generated relative ordering data for use in subsequent instances of the instruction block.

24 Claims, 18 Drawing Sheets

(51) Int. Cl.
    *G06F 9/32*           (2018.01)
    *G06F 9/345*         (2018.01)
    *G06F 9/35*           (2018.01)
    *G06F 9/38*           (2018.01)
    *G06F 9/46*           (2006.01)
    *G06F 9/52*           (2006.01)
    *G06F 11/36*         (2006.01)
    *G06F 12/0806*      (2016.01)
    *G06F 12/0862*      (2016.01)
    *G06F 12/1009*      (2016.01)
    *G06F 13/42*         (2006.01)
    *G06F 15/78*         (2006.01)
    *G06F 15/80*         (2006.01)
    *G06F 9/355*        (2018.01)
    *G06F 12/0811*      (2016.01)
    *G06F 12/0875*      (2016.01)

(52) U.S. Cl.
    CPC ...... *G06F 9/30021* (2013.01); *G06F 9/30036* (2013.01); *G06F 9/3004* (2013.01); *G06F 9/30043* (2013.01); *G06F 9/30047* (2013.01); *G06F 9/3005* (2013.01); *G06F 9/30058* (2013.01); *G06F 9/30072* (2013.01); *G06F 9/30076* (2013.01); *G06F 9/30087* (2013.01); *G06F 9/3009* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/3804* (2013.01); *G06F 9/3822* (2013.01); *G06F 9/3824* (2013.01); *G06F 9/3828* (2013.01); *G06F 9/383* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3856* (2023.08); *G06F 9/38585* (2023.08); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/00* (2018.01)

(56) References Cited

U.S. PATENT DOCUMENTS

| | | |
|---|---|---|
| 5,333,283 A | 7/1994 | Emma et al. |
| 5,615,350 A | 3/1997 | Hesson |
| 5,669,001 A | 9/1997 | Moreno |
| 5,729,228 A | 3/1998 | Franaszek et al. |
| 5,751,985 A * | 5/1998 | Shen .......... G06F 9/3004 712/218 |
| 5,790,822 A | 8/1998 | Sheaffer et al. |
| 5,796,997 A | 8/1998 | Lesartre et al. |
| 5,845,103 A | 12/1998 | Sodani et al. |
| 5,903,750 A | 5/1999 | Yeh et al. |
| 5,905,893 A | 5/1999 | Worrell |
| 5,917,505 A | 6/1999 | Larson |
| 5,943,501 A | 8/1999 | Burger et al. |
| 5,996,070 A * | 11/1999 | Yamada .......... G06F 9/30058 712/E9.05 |
| 6,016,399 A | 1/2000 | Chang |
| 6,061,776 A | 5/2000 | Burger et al. |
| 6,161,170 A | 12/2000 | Burger et al. |
| 6,164,841 A | 12/2000 | Mattson et al. |
| 6,167,491 A | 12/2000 | McAlpine |
| 6,178,498 B1 | 1/2001 | Sharangpani et al. |
| 6,212,621 B1 | 4/2001 | Mahalingaiah |
| 6,212,622 B1 | 4/2001 | Witt |
| 6,240,510 B1 | 5/2001 | Yeh et al. |
| 6,282,708 B1 | 8/2001 | Augusteijn et al. |
| 6,314,493 B1 | 11/2001 | Luick |
| 6,353,883 B1 | 3/2002 | Grochowski et al. |
| 6,493,820 B2 | 12/2002 | Akkary et al. |
| 6,529,922 B1 | 3/2003 | Hoge |
| 6,662,294 B1 | 12/2003 | Kahle et al. |
| 6,820,192 B2 | 11/2004 | Cho et al. |
| 6,892,292 B2 | 5/2005 | Henkel et al. |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,085,919 B2 | 8/2006 | Grochowski et al. |
| 7,095,343 B2 | 8/2006 | Xie et al. |
| 7,299,458 B2 | 11/2007 | Hammes |
| 7,302,543 B2 | 11/2007 | Lekatsas et al. |
| 7,380,038 B2 | 5/2008 | Gray |
| 7,487,340 B2 | 2/2009 | Luick |
| 7,571,284 B1 | 8/2009 | Olson |
| 7,624,386 B2 | 11/2009 | Robison |
| 7,631,170 B2 | 12/2009 | Dowling |
| 7,676,650 B2 | 3/2010 | Ukai |
| 7,676,669 B2 | 3/2010 | Ohwada |
| 7,836,289 B2 | 11/2010 | Tani |
| 7,853,777 B2 | 12/2010 | Jones et al. |
| 7,877,580 B2 | 1/2011 | Eickemeyer et al. |
| 7,917,733 B2 | 3/2011 | Kazuma |
| 7,970,965 B2 | 6/2011 | Kedem et al. |
| 8,024,522 B1 | 9/2011 | Favor et al. |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,250,556 B1 | 8/2012 | Lee et al. |
| 8,312,452 B2 | 11/2012 | Neiger et al. |
| 8,321,850 B2 | 11/2012 | Bruening et al. |
| 8,433,885 B2 | 4/2013 | Burger et al. |
| 8,434,074 B2 | 4/2013 | Janczak et al. |
| 8,447,911 B2 | 5/2013 | Burger et al. |
| 8,464,002 B2 | 6/2013 | Burger et al. |
| 8,583,895 B2 | 11/2013 | Jacobs et al. |
| 8,589,892 B2 | 11/2013 | Fournier et al. |
| 8,677,105 B2 | 3/2014 | Abdallah |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 10,180,840 B2 | 1/2019 | Burger et al. |
| 2001/0032308 A1 | 10/2001 | Grochowski et al. |
| 2002/0016907 A1 | 2/2002 | Grochowski et al. |
| 2003/0023959 A1 | 1/2003 | Park |
| 2003/0070062 A1 | 4/2003 | Krishnan et al. |
| 2004/0080620 A1 | 4/2004 | Silverbrook |
| 2004/0083351 A1 * | 4/2004 | Merchant .......... G06F 9/3863 712/218 |
| 2004/0083468 A1 | 4/2004 | Ogawa et al. |
| 2004/0139299 A1 | 7/2004 | Busaba et al. |
| 2004/0193849 A1 | 9/2004 | Dundas |
| 2004/0216095 A1 | 10/2004 | Wu |
| 2005/0172277 A1 | 8/2005 | Chheda et al. |
| 2005/0204348 A1 | 9/2005 | Horning et al. |

(56) References Cited

U.S. PATENT DOCUMENTS

| | | | |
|---|---|---|---|
| 2006/0090063 | A1* | 4/2006 | Theis ............... G06F 9/30072 |
| | | | 712/E9.031 |
| 2007/0226735 | A1 | 9/2007 | Nguyen et al. |
| 2007/0239975 | A1 | 10/2007 | Wang |
| 2007/0260854 | A1 | 11/2007 | Smith et al. |
| 2007/0288733 | A1 | 12/2007 | Luick |
| 2008/0109637 | A1 | 5/2008 | Martinez et al. |
| 2008/0244244 | A1* | 10/2008 | Tuuk ............... G06F 11/1064 |
| | | | 712/226 |
| 2009/0013135 | A1 | 1/2009 | Burger et al. |
| 2009/0013160 | A1 | 1/2009 | Burger et al. |
| 2009/0019263 | A1 | 1/2009 | Shen et al. |
| 2009/0106541 | A1 | 4/2009 | Mizuno et al. |
| 2009/0158017 | A1 | 6/2009 | Mutlu et al. |
| 2009/0172365 | A1 | 7/2009 | Orenstien et al. |
| 2009/0172371 | A1 | 7/2009 | Joao et al. |
| 2009/0187739 | A1 | 7/2009 | Nemirovsky et al. |
| 2009/0217247 | A1* | 8/2009 | Kamigata ........... G06F 11/3612 |
| | | | 717/131 |
| 2009/0287908 | A1* | 11/2009 | Rangan ............... G06F 9/384 |
| | | | 712/206 |
| 2010/0146209 | A1 | 6/2010 | Burger et al. |
| 2010/0161948 | A1 | 6/2010 | Abdallah |
| 2010/0191943 | A1 | 7/2010 | Bukris |
| 2010/0250901 | A1* | 9/2010 | Abernathy ........... G06F 9/3838 |
| | | | 712/214 |
| 2010/0325395 | A1 | 12/2010 | Burger et al. |
| 2011/0035551 | A1 | 2/2011 | Hooker et al. |
| 2011/0060889 | A1 | 3/2011 | Burger et al. |
| 2011/0072239 | A1 | 3/2011 | Burger et al. |
| 2011/0078424 | A1 | 3/2011 | Boehm et al. |
| 2011/0202749 | A1 | 8/2011 | Jin et al. |
| 2012/0030451 | A1 | 2/2012 | Pong et al. |
| 2012/0084759 | A1* | 4/2012 | Candea ............... G06F 11/3612 |
| | | | 717/126 |
| 2012/0158647 | A1 | 6/2012 | Yadappanavar et al. |
| 2012/0216012 | A1 | 8/2012 | Vorbach et al. |
| 2012/0246448 | A1 | 9/2012 | Abdallah |
| 2012/0246657 | A1 | 9/2012 | Abdallah |
| 2012/0303933 | A1 | 11/2012 | Manet et al. |
| 2012/0311306 | A1 | 12/2012 | Mushano |
| 2013/0198499 | A1 | 8/2013 | Dice et al. |
| 2014/0006714 | A1 | 1/2014 | Cherukuri et al. |
| 2014/0136786 | A1 | 5/2014 | Carpenter et al. |
| 2014/0181475 | A1 | 6/2014 | Abdallah |
| 2014/0189239 | A1 | 7/2014 | Hum et al. |
| 2014/0215190 | A1 | 7/2014 | Mylius et al. |
| 2014/0281428 | A1 | 9/2014 | Abdallah |
| 2014/0281434 | A1 | 9/2014 | Madriles et al. |
| 2014/0281436 | A1 | 9/2014 | Mohammad |
| 2014/0372736 | A1 | 12/2014 | Greenhalgh |
| 2015/0006146 | A1 | 1/2015 | Kim et al. |
| 2015/0026444 | A1 | 1/2015 | Anderson et al. |
| 2015/0067662 | A1 | 3/2015 | Palalau |
| 2015/0089191 | A1 | 3/2015 | Gonion |
| 2015/0095578 | A1* | 4/2015 | Doshi ............... G06F 12/0891 |
| | | | 711/125 |
| 2015/0100757 | A1 | 4/2015 | Burger et al. |
| 2015/0127928 | A1 | 5/2015 | Burger et al. |
| 2015/0186293 | A1 | 7/2015 | Lin |
| 2015/0199199 | A1 | 7/2015 | Burger et al. |
| 2015/0199272 | A1 | 7/2015 | Goel et al. |
| 2016/0203081 | A1 | 7/2016 | Kimura |
| 2016/0259645 | A1 | 9/2016 | Wright |
| 2017/0083314 | A1 | 3/2017 | Burger et al. |
| 2017/0083318 | A1 | 3/2017 | Burger et al. |
| 2017/0083319 | A1 | 3/2017 | Burger et al. |
| 2017/0083320 | A1 | 3/2017 | Burger et al. |
| 2017/0083324 | A1 | 3/2017 | Burger et al. |
| 2017/0083326 | A1 | 3/2017 | Burger et al. |
| 2017/0083341 | A1 | 3/2017 | Burger et al. |

FOREIGN PATENT DOCUMENTS

| | | |
|---|---|---|
| CN | 101542441 A | 9/2009 |
| CN | 101681262 A | 3/2010 |
| CN | 101763285 A | 6/2010 |
| CN | 101918917 A | 12/2010 |
| CN | 102902529 A | 1/2013 |
| CN | 103177063 A | 6/2013 |
| CN | 104040487 A | 9/2014 |
| CN | 104049953 A | 9/2014 |
| CN | 104077107 A | 10/2014 |
| CN | 104126173 A | 10/2014 |
| CN | 104583958 A | 4/2015 |
| EP | 0583089 | 2/1994 |
| EP | 2527972 | 11/2012 |
| EP | 2759907 A | 7/2014 |
| JP | 2001175473 A | 6/2001 |
| JP | 2002149401 A | 5/2002 |
| JP | 2013500539 A | 7/2013 |
| WO | WO 2010/147857 | 12/2010 |
| WO | WO 2013/095635 | 6/2013 |
| WO | WO 2014/193878 | 12/2014 |

OTHER PUBLICATIONS

International Search Report and Written Opinion for PCT/US2016/051408, dated Jan. 2, 2017, 11 pages.

PCT Chapter II Demand for International Preliminary Examination and amended claims under Article 34 submitted to the European Patent Office dated Jun. 22, 2017, for PCT/US2016/051408, pp. 1-6.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with EDGE Architectures," In Proceedings of Computer, vol. 37, Issue 7, Jul. 1, 2004, pp. 44-55.

Cain et al., "Memory Ordering: A Value-Based Approach", In Journal of IEEE Micro, vol. 24, Issue 1, Jan. 2004, pp. 110-117.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

"Explicit Data Graph Execution", Retrieved on: Aug. 6, 2015, Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Gray and Smith, "Towards an Area-Efficient Implementation of a High ILP Edge Soft Processor: Comparing Out-of-Order Dataflow Instruction Scheduler Designs," poster temporarily on display during The 22nd IEEE International Symposium on Field-Programmable Custom Computing Machines May 11-13, 2014, Boston, Massachusetts (poster on display for approximately 1-2 hours, and less than one day, May 2014).

Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published

(56) References Cited

OTHER PUBLICATIONS as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al., "Code Layout Optimization for Defensiveness and Politeness in Shared Cache" 43rd International Conference on Parallel Processing (ICPP), IEEE, pp. 151-161 (2014)).
Maher, "Atomic Block Formation for Explicit Data Graph Execution Architectures", In Dissertation of Doctor of Philosophy, Aug. 2010, 185 pages.
McDonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field- Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Nagarajan et al., "Critical Path Analysis of the TRIPS Architecture," In IEEE International Symposium on Performance Analysis of Systems and Software, Mar. 19, 2006, 11 pages.
Pengfei et al., "M5 Based EDGE Architecture Modeling", In Proceedings of IEEE International Conference on Computer Design, Oct. 3, 2010, pp. 289-296.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Roesner, et al., "Counting Dependence Predictors," In Proceedings of the 35th Annual International Symposium on Computer Architecture, Jun. 21, 2008, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", In Doctoral Dissertation of Philosophy, Aug. 2007, 276 pages.

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Smith et al., "Compiling for EDGE Architectures," In Proceedings of International Symposium on Code Generation and Optimization, Mar. 26, 2006, 11 pages.
Smith, "Explicit Data Graph Compilation," In Thesis, Dec. 2009, 201 pages.
Smith, "Trips Application Binary Interface (ABI) Manual," Technical Report TR-05-22, Department of Computer Sciences, The University of Texas at Austin, Technical Report TR-05-22, document marked Oct. 10, 2006, 16 pages.
Duric et al., "Dynamic-Vector Execution on a General Purpose EDGE Chip Multiprocessor," In Proceedings of the 2014 International Conference on Embedded Computers Systems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gulati et al., "Multitasking Workload Scheduling on Flexible Core Chip Multiprocessors," In Proceedings of the Computer Architecture News, vol. 36, Issue 2, May 2008, 10 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Ipek et al., "Core Fusion: Accommodating Software Diversity in Chip Multiprocessors", In Proceedings of the 34th annual international symposium on Computer architecture, Jun. 9, 2007, 12 pages.
Kavi, et al., "Concurrency, Synchronization, Speculation—the Dataflow Way", In Journal of Advances in Computers, vol. 96, Nov. 23, 2013, pp. 1-41.
Li et al., "Compiler-assisted Hybrid Operand Communication", In TechReport TR-09-33, Nov. 2009, 12 pages.
Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).
Liu, "Hardware Techniques to Improve Cache Efficiency," In Dissertation of the University of Texas at Austin, May 2009, 189 pages.
"Load/store architecture," Retrieved on: Sep. 24, 2015; Available at: https://en.wikipedia.org/wiki/Load/store_architecture.
Maher et al., "Merging Head and Tail Duplication for Convergent Hyperblock Formation," In Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
Munshi, et al., "A Parameterizable SIMD Stream Processor", In Proceedings of Canadian Conference on Electrical and Computer Engineering, May 1, 2005, pp. 806-811.

(56) References Cited

OTHER PUBLICATIONS

Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pierce et al., "Wrong-Path Instruction Prefetching", In Proceedings of the 29th Annual IEEE/ACM International Symposium on Microarchitecture, Dec. 2, 1996, pp. 1-17.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Roesner, "Counting Dependence Predictors," In Undergraduate Honors Thesis, May 2, 2008, 25 pages.
Sibi et al., "Scaling Power and Performance via Processor Composability," University of Texas at Austin technical report No. TR-10-14 (2010), 20 pages.
Smith et al., "Dataflow Predication", In Proceedings of 39th Annual IEEE/ACM International Symposium on Microarchitecture, Dec. 9, 2006, 12 pages.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
"Very Long Instruction Word", Retrieved From: http://en.wikipedia.org/wiki/Verylong_instruction_word, Feb. 13, 2013, 7 Pages.
"Final Office Action Issued in U.S. Appl. No. 14/757,944", dated Jul. 9, 2018, 18 Pages.
"Non Final Office Action Issued in U.S. Appl. No. 14/757,944", dated Sep. 21, 2017, 21 Pages.
August, et al., "A Framework for Balancing Control Flow and Predication", In IEEE/ ACM 30th Annual International Symposium on Microarchitecture, Dec. 3, 1997, 12 Pages.
Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.
Chuang, et al., "Predicate Prediction for Efficient Out-of-Order Execution", In Proceedings of the 17th Annual International Conference on Supercomputing, Jun. 23, 2003, 10 Pages.
Coons, et al., "Optimal Huffman Tree-Height Reduction for Instruction-Level Parallelism", In Technical Report TR-08-34, Aug. 2007, 26 Pages.
Ebcioglu, et al., "An Eight-Issue Tree-VLIW Processor for Dynamic Binary Translation", In Proceedings of the International Conference on Computer Design, Nov. 1998, 9 Pages.
Ferrante, et al., "The Program Dependence Graph and Its Use in Optimization", In Proceedings of ACM Transactions on Programming Languages and Systems, vol. 9, Issue 3, Jul. 1, 1987, 31 Pages.

Havanki, et al., "Treegion Scheduling for Wide Issue Processors", In Proceedings of the 4th International Symposium on High-Performance Computer Architecture, Feb. 1, 1998, 11 Pages.
Iuh, et al., "A NUCA Substrate for Flexible CMP Cache Sharing", In Proceedings of 19th International Conference on Supercomputing, Jun. 20, 2005, 10 Pages.
Mahlke, et al., "Effective Compiler Support for Predicated Execution Using the Hyperblock", In Proceedings of the 25th Annual International Symposium on Microarchitecture, Dec. 1992, 10 Pages.
Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.
Mai, et al., "Smart Memories: A Modular Reconfigurable Architecture", In Proceedings of the 27th International Symposium on Computer Architecture, Jun. 14, 2011, 11 Pages.
Mcdonald, et al., "The Design and Implementation of the TRIPS Prototype Chip", In IEEE Hot Chips XVII Symposium (HCS), Aug. 17, 2005, 24 Pages.
Moreno, et al., "Scalable Instruction-level Parallelism through Tree-Instructions", In Proceedings of the 11th International Conference on Supercomputing, Jul. 11, 1997, 14 Pages.
Netto, et al., "Code Compression to Reduce Cache Accesses", In Technical Report—IC-03-023, Nov. 2003, 15 Pages.
Pan, et al., "High Performance, Variable-Length Instruction Encodings", In Doctoral Dissertation of Massachusetts, Institute of Technology, May 2002, 53 Pages.
Parcerisa, et al., "Design of Clustered Superscalar Microarchitectures", In Thesis Submitted to Polytechnic, University of Catalunya, Barcelona (Spain), Apr. 2004, 28 Pages.
"International Search Report and Written Opinion Issued in PCT Application No. PCT/US2016/051207", dated Dec. 16, 2016, 11 Pages.
Pneumatikatos, et al., "Guarded Execution and Branch Prediction in Dynamic ILP Processors", In Proceedings of the 21st Annual International Symposium on Computer Architecture, Apr. 1994, 11 Pages.
Quinones, et al., "Improving Branch Predication and Predicated Execution in Out-of-Order Processors", In IEEE 13th International Symposium on High Performance Computer Architecture, Feb. 2007, 10 Pages.
Quinones, et al., "Selective Predicate Prediction for Out-of-Order Processors", In Proceedings of the 20th Annual International Conference on Supercomputing, Jun. 28, 2009, 9 Pages.
Ranganathan, Nitya, "Control Flow Speculation for Distributed Architectures", In Dissertation Presented to the Faculty of the Graduate School of The University of Texas at Austin, May 2009, 40 Pages.
Ros, et al., "A Hamming Distance Based VLIW/EPIC Code Compression Technique", In Proceedings of the International Conference on Compilers, Architecture, and Synthesis for Embedded Systems, Sep. 22, 2004, 8 Pages.
Sankaralingam, et al., "Universal Mechanisms for Data-Parallel Architectures", In Proceedings of the 36th International Symposium on Microarchitecture, Dec. 3, 2003, 12 Pages.
Simon, et al., "Incorporating Predicate Information Into Branch Predictors", In Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International Conference on Architectural Support for Programming Languages and Operating Systems, Apr. 1991, 8 Pages.
Uht, et al., "Disjoint Eager Execution: An Optimal Form of Speculative Execution", In Proceedings of the 28th International Symposium on Microarchitecture, Nov. 1995, 13 Pages.
Wilson, et al., "Designing High Bandwidth On-Chip Caches", In Proceedings of the 24th Annual International Symposium on Computer Architecture, Jun. 1997, 12 Pages.
Xie, et al., "A Code Decompression Architecture for VLIW Processors", In Proceedings of 34th ACM/IEEE International Symposium on Microarchitecture, Dec. 1, 2001, 10 Pages.

(56) References Cited

OTHER PUBLICATIONS

"Non Final Office Action Issued in U.S. Appl. No. 14/757,941", dated Jan. 11, 2019, 16 Pages.
"Final Office Action Issued in U.S. Appl. No. 14/942,345", dated Dec. 31, 2018, 14 Pages.
"Non Final Office Action Issued in U.S. Appl. No. 14/942,461", dated Jan. 18, 2019, 9 Pages.
"Final Office Action Issued in U.S. Appl. No. 14/942,557", dated Dec. 31, 2018, 16 Pages.
"Non Final Office Action Issued in U.S. Appl. No. 15/073,365", dated Dec. 4, 2018, 13 Pages.
"Final Office Action Issued in U.S. Appl. No. 15/074,938", dated Dec. 3, 2018, 9 Pages.
Salzman, et al., "The Art of Debugging with GDB and DDD", In Book—The Art of Debugging with GDB and DDD, No Starch Press Publication, Sep. 2008, 27 Pages.
International Preliminary Report on Patentability for PCT/US2016/051408, dated Dec. 14, 2017, pp. 1-14.
Written Opinion of the International Preliminary Examining Authority for PCT/US2016/051408, dated Aug. 25, 2017, pp. 1-6.
"Final Office Action Issued in U.S. Appl. No. 14/921,855", dated Sep. 20, 2019, 11 Pages.
"Office Action Issued in European Patent Application No. 16766815.1", dated Nov. 14, 2019, 15 Pages.
"Non Final Office Action Issued in U.S. Appl. No. 15/012,662", dated Feb. 4, 2020, 10 Pages.
Pagiamtzis, et al., "Content-Addressable Memory (CAM) Circuits and Architectures: A Tutorial and Survey", In Journal of Solid-State Circuits, vol. 41, Issue 3, Feb. 27, 2006, pp. 712-727.
"Non Final Office Action Issued in U.S. Appl. No. 14/921,855", dated May 27, 2020, 29 Pages.
"Office Action Issued in European Patent Application No. 16766815.1", dated Aug. 3, 2020, 8 Pages.
"Office Action Issued in European Patent Application No. 16775908.3", dated Jan. 12, 2021, 6 Pages.
"Office Action Issued in European Patent Application No. 16775910.9", dated Nov. 25, 2020, 9 Pages.
"First Office Action and Search Report Issued in Chinese Patent Application No. 201680054501.5" dated Dec. 25, 2020, 10 Pages.
"Second Office Action Issued in Chinese Patent Application No. 201680054181.3", dated Aug. 25, 2021, 8 Pages.
"Second Office Action and Search Report Issued in Chinese Patent Application No. 201680054458.2", dated Aug. 24, 2021, 28 Pages.
Jin, Fangqi, "Research of Reconfigurable Cycle Accurate Simulation Platform for Embedded Processor", A Thesis Submitted in Conformity with the requirement for Degree of Master at Zhejiang University, Jun. 2006, 10 Pages.
"Research for Micro-Architecture Optimization on Media DSP IP Core", In China Academic Journal Electronic Publishing House, Jul. 15, 2011, 181 Pages.
"Final Office Action Issued in U.S. Appl. No. 14/921,855", dated Feb. 9, 2022, 23 Pages.
"Notice of Allowance Issued in Chinese Patent Application No. 201680054181.3", dated May 25, 2022, 3 Pages.
"Third Office Action Issued in Chinese Patent Application No. 201680054181.3", dated Jan. 4, 2022, 6 Pages.
"Notice of Allowance Issued in Chinese Patent Application No. 201680054458.2", dated Mar. 9, 2022, 5 Pages.
"Office Action Issued in Chinese Patent Application No. 201680054500.0", dated Mar. 30, 2022, 4 Pages.
"Office Action Issued in Chinese Patent Application No. 201680054458.2", dated Nov. 8, 2021, 9 Pages.
"Notice of Allowance Issued in U.S. Appl. No. 14/921,855", dated Aug. 25, 2022, 8 Pages.
"Office Action Issued in European Patent Application No. 16775374.8", dated Aug. 23, 2022, 4 Pages.
"Notice of Allowance Issued in Chinese Patent Application No. 201680054500.0", dated Jul. 4, 2022, 4 Pages.
"Office Action Issued in European Patent Application No. 16775374.8", dated Feb. 14, 2022, 7 Pages.
"Second Office Action Issued in Chinese Patent Application No. 201680054500.0", dated Oct. 18, 2021, 9 Pages.
"Notice of Allowance Issued In European Patent Application No. 16766615.1", dated Jan. 27, 2022, 3 Pages.
"Notice of Allowance Issued in European Patent Application No. 16775910.9", dated Feb. 24, 2022, 2 Pages.
"Notice of Allowance Issued in European Patent Application No. 16775908.3", dated Jun. 29, 2022, 7 Pages.
"Notice of Allowance Issued in European Patent Application No. 16775910.9", dated Nov. 23, 2021, 7 Pages.
"Notice of Allowance Issued in European Patent Application No. 16766815.1", dated Oct. 5, 2021, 7 Pages.
"Non Final Office Action Issued in U.S. Appl. No. 14/921,855", dated Dec. 9, 2022, 14 Pages.
"Final Office Action Issued in U.S. Appl. No. 14/921,855", dated May 14, 2018, 48 Pages.
"Final Office Action Issued in U.S. Appl. No. 14/921,855", dated Dec. 11, 2020, 29 Pages.
"Non Final Office Action Issued in U.S. Appl. No. 14/921,855", dated Apr. 17, 2019, 28 Pages.
"Non Final Office Action Issued in U.S. Appl. No. 14/921,855", dated Oct. 4, 2017, 30 Pages.
"Non Final Office Action Issued in U.S. Appl. No. 14/921,855", dated Jul. 6, 2021, 22 Pages.
"Office Action Issued in European Patent Application No. 16775374.8", dated Feb. 24, 2021, 7 Pages.
"Office Action Issued in Chinese Patent Application No. 201680054500.0", dated Jan. 8, 2021, 21 Pages.
"Second Written Opinion Issued in PCT Application No. PCT/US2016/051407", dated Aug. 18, 2017, 7 Pages.
"Second Office Action Issued in Chinese Patent Application No. 201680054500.0", dated Oct. 18, 2021, 8 Pages.
"International Search Report and Written Opinion Issued in PCT Application No. PCT/US2016/051407", dated Jan. 2, 2017, 12 Pages.
"Notice of Allowance Issued in U.S. Appl. No. 14/921,855", dated Mar. 2, 2023, 7 Pages.
"Office Action Issued in European Patent Application No. 16775374.8", dated Jul. 5, 2023, 4 Pages.

* cited by examiner

FIG. 5
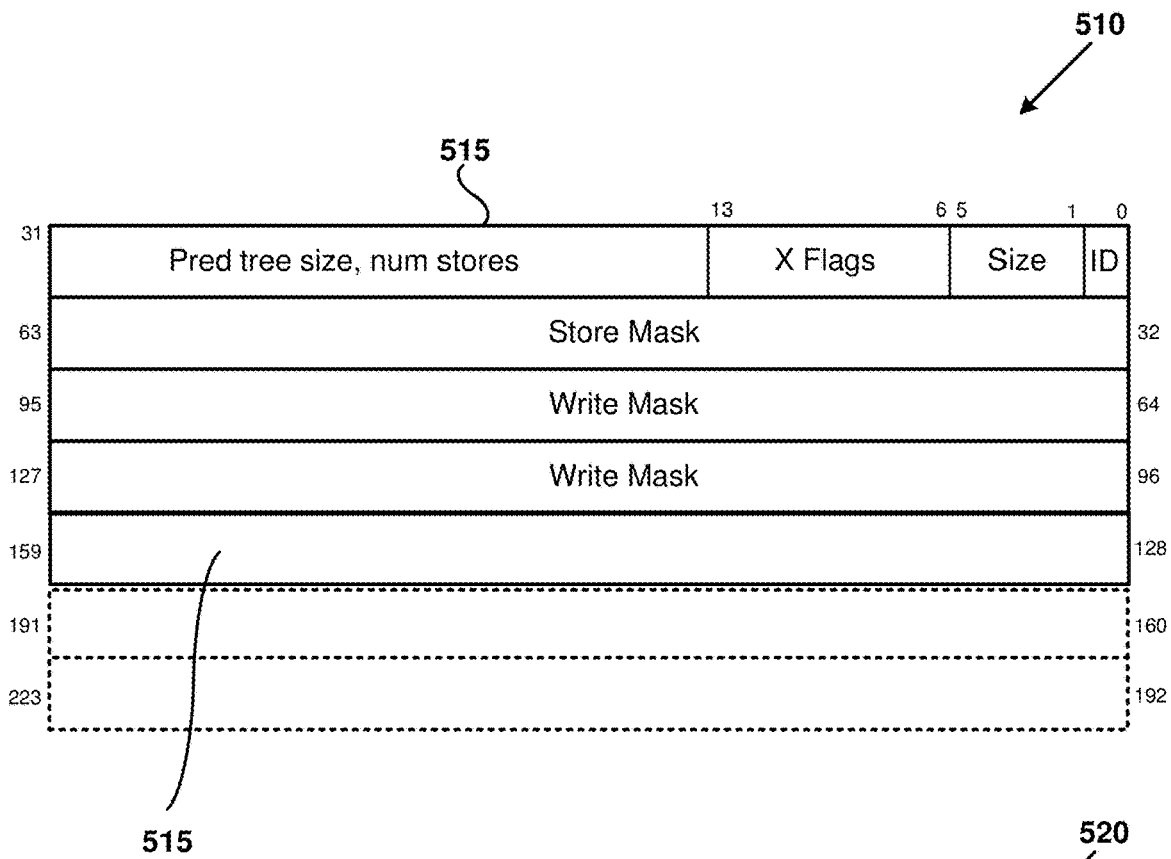
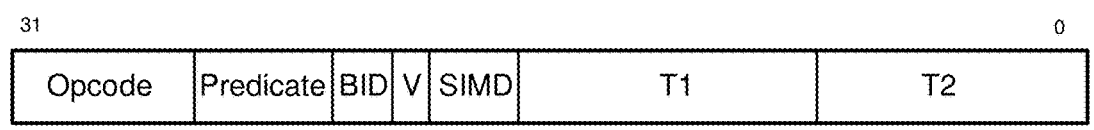
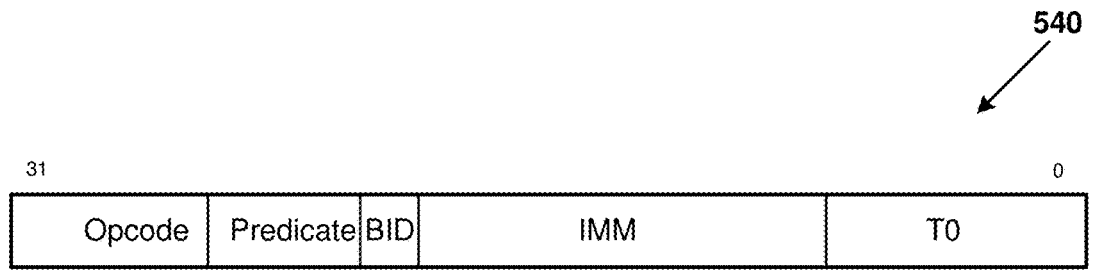

```
++i;
if(a[i]>a[i+1] {
  t      = a[i];
  a[i]   = a[i+1];
  a[i+1] = t;
} else {
  b[i]=b[i]+1;
  if(i>100) {
    x=b[i];
  } else {
    b[5]=0xff;
  }
}
```

920

```
//  opcd    src bid      target(s)
 0: readl   R1           T[3R]  T[19R]   // i
 1: readl   R2           T[3L]                 // a
 2: readl   R3           T[14R] T[21R]  // b
 3: addi    #1           B1R                   // ++i
 4: add         B1R      T[5R]  T[6R]   // &a[i] (i.e., a+i)
 5: mov                  T[7R]  T[8R]
 6: mov                  T[12R] T[13R]
 7: ld      #0           T[9R]                 // a[i]
 8: ld      #1           T[10R]                // a[i+1]
 9: mov                  T[13L] T[11L]  // a[i]
10: mov                  T[12L] T[11R]  // a[i+1]
11: tgt                  B2P    T[14P]  // a[i] > a[i+1] ?
12: sd_t        B2P                     // a[i]   = a[i+1]
13: sd_t        B2P                     // a[i+1] = t (i.e., a[i])
14: mov                  T[15L] T[19R]  // b
15: add         B1R      T[16R] T[18R]  // &b[i]
16: ld_f    #0  B2P      T[17R]                // b[i]
17: addi_f  #1  B2P      T[18L]                // b[i]+1
18: sd_f        B2P                     // b[i] = b[i]+1
19: addi    #1           T[20R] T[22R]  // ++i (duplicate)
20: tgt_f   #100 B2P     T[23P] T[26P]  // i > 100 (i<=100)
21: mov                  T[22L] T[24R]  // b
22: add         B1R      T[23R] T[25R]  // &b[i]
23: ld_t    #0           R5                    // x=b[i]
24: addi    #5             T[26R]              // &b[5]
25: movi    #ff          T[26L]                // 0xff
26: sd_f    #0                          // b[5]=0xff
27: bro     NEXTBLOCK                   // jump to next instruction block
```

| Path (pq) | ∀ | 1– | 0– | 11 | 10 | 01 | 00 |
|---|---|---|---|---|---|---|---|
| Inst. ID# | 7, 8 | 12, 13 | 16, 18 | – | – | 23 | 26 |
| Load/Store | L, L | S, S | L, S | – | – | L | S |

| Path (pq) | ∀ | 11 | 10 | 01 | 00 |
|---|---|---|---|---|---|
| Inst. ID# | 7, 8 | 12, 13 | 12, 13 | 16, 18, 23 | 16, 18, 26 |
| Load/Store | L, L | S, S | S, L | L, S, L | L, S, S |
| Total No. of Stores | 0 | 2 | 2 | 1 | 2 |

| Path (pq): | ∀ | 1– | 0– | 00 | 01 |
|---|---|---|---|---|---|
| No. Load/Stores | 2 | 2 | – | 2 | 1 |
| No. Stores | 0 | 1 | – | 1 | 0 |

| Inst. ID# / Path (pq) | 7 | 8 | 12 | 13 | 16 | 18 | 23 | 26 |
|---|---|---|---|---|---|---|---|---|
| 00 | 0 | 0 | 0 | 0 | 0 | 1 | 0 | 1 |
| 01 | 0 | 0 | 0 | 0 | 0 | 1 | 0 | 0 |
| 10 | 0 | 0 | 1 | 1 | 0 | 0 | 0 | 0 |
| 11 | 0 | 0 | 1 | 1 | 0 | 0 | 0 | 0 |
| OR-mask | 0 | 0 | 1 | 1 | 0 | 1 | 0 | 1 |

IMPLICIT PROGRAM ORDER

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In one example of the disclosed technology, a block-based processor is configured to control the order in which memory access instructions (e.g., memory load and memory store instructions) issue and execute by generating identifiers indicating a relative ordering for two or more of the memory access instructions in an instruction block. In some examples, a store mask is generated when decoding an instruction block or read directly from an instruction block header and stored in the hardware structure. In some examples, an instruction decoder is configured to generated relative ordering identifiers, which can be stored for subsequent instances of the instruction block. In some examples, a method of operating a block-based processor comprises decoding an instruction block, generating data indicating a relative order for executing memory access instructions in the instruction block, and scheduling operation of at least a portion of the instruction block based on the relative order data. In some examples, a compiler or interpreter transforms source code and/or object code to executable code for a block-based processor, including memory access instructions that can be decoded to determine ordering identifiers and/or store mask information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIG. 9 illustrates example source and assembly code, as can be used in certain examples of the disclosed technology.

FIGS. 11-14 illustrate examples data that can be used to order instructions, as can be used in certain examples of the disclosed technology.

DETAILED DESCRIPTION

I. General Considerations

Figure 1:
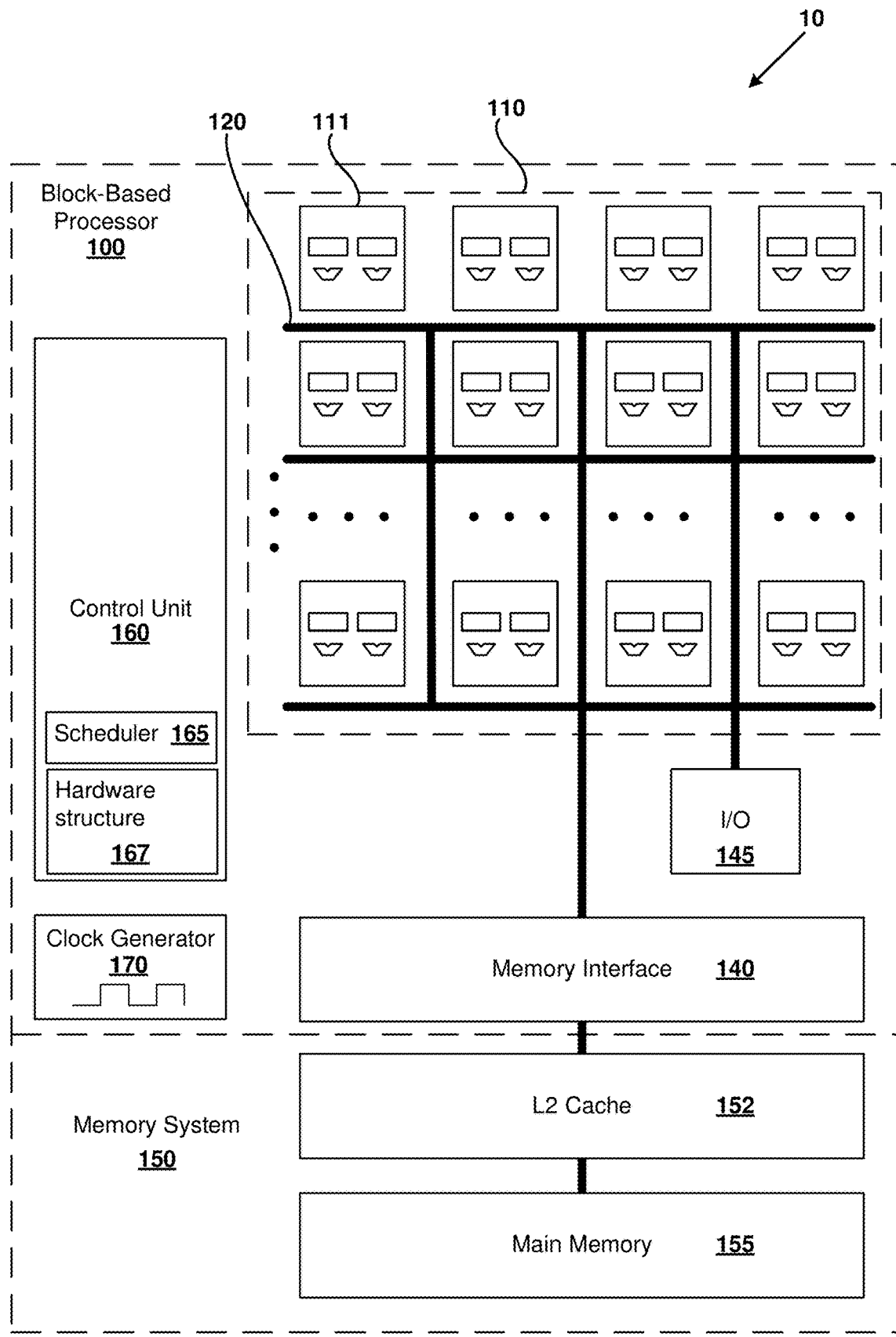
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Apparatus, methods, and computer-readable storage media are disclosed for generation and use of block-based branch metadata for block-based processors. In certain examples of the disclosed technology, instruction blocks include an instruction block header and a plurality of instructions. In other words, the executed instructions of the instruction block affect the state, or do not affect the state as a unit.

In some examples of the disclosed technology, a hardware structure stores data indicating an execution order to be adhered to for a number of memory access instructions, including memory load and memory store instructions. A control unit coupled to a processor core control issuance of memory access instructions based at least in part on data stored in the hardware structure. Thus, memory read/write hazards can be avoided, while allowing for instructions in an instruction block to execute as soon as their dependencies are available.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes memory access instruction hardware structure 167, which can be used to store data including data indicating a relative ordering for executing memory access instructions, such as a store mask or store counter, and a store vector register, which stores data indicating which instructions (e.g., which load and/or store instructions) have executed within an instruction block, as discussed in further detail below.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
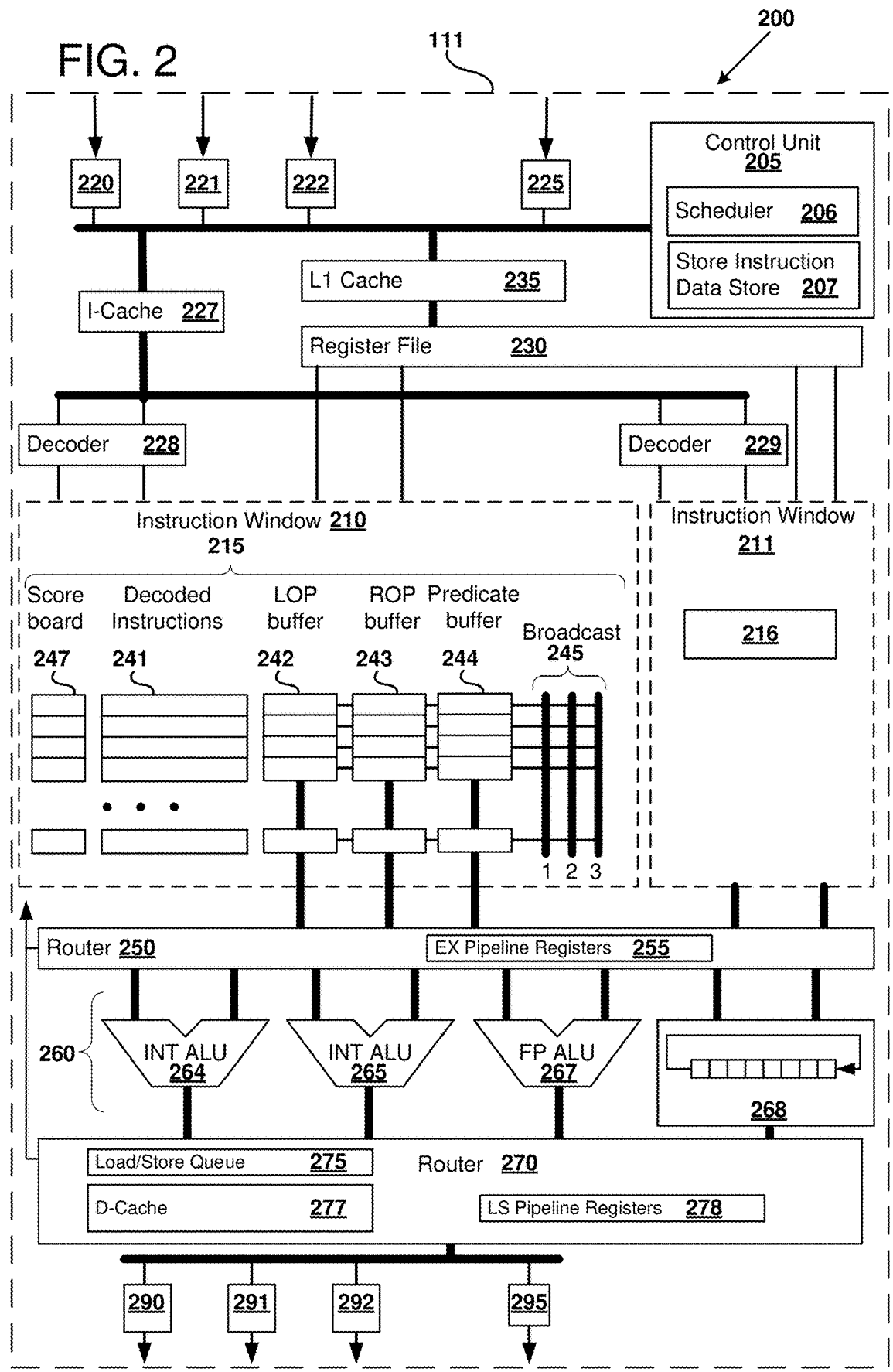
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, data indicating memory access instruction relative ordering can be stored in a hardware structure such as a store instruction data store 207. The store instruction data store 207 can store data for a store mask (e.g., generated by copying data encoded in an instruction block or by an instruction decoder when decoding instructions), store count data (e.g., data indicating a number of memory stores to be executed before a particular next instruction can issue), a store counter (e.g., a counter storing data that indicates the number of store instructions that have issued or executed), a store vector register (e.g., storing data indicating which and what types of memory access instructions have executed), and masked store vector register data (e.g., data generated by applying the store mask to the store vector register). In some examples, the store instruction data store 207 includes a counter that tracks the number and type of memory access instructions that have executed. In some examples, the store instruction data store 207 stores data in a table (e.g. a multi-dimensional table) indicating instruction identifiers, predicates, predicate paths, number of load/ stores, or other information that can be used to determine a relative ordering of execution of memory access instructions.

The instruction decoders 228 and 229 can specify a relative order for issuing and executing load and store instructions within a block. For example, a numerical load/ store identifier (LSID) can be assigned to each memory access instruction, or to only the memory store instructions. A higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure operation of the processor core 111 according to execution flags specified in an instruction block header or in an instruction. Each of the instruction decoders 228 and 229 are configured to generate identifiers indicating a relative ordering for one or more memory access instructions in an instruction block. These identifiers can be used to determine that all memory access instructions to be executed for the instruction block have executed. For example, the instruction decoders can analyze the instructions (e.g., by constructing a control flow graph or equivalent) to determine predicates associated with memory access instructions in the block. Based on the predicates, it is determined that certain memory access instructions must execute before other memory access or jump instructions in order to allow proper instruction block implementation.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 245 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 245. The control unit 205 further monitors data indicating a relative ordering of memory access instructions (e.g., using load/store identifiers generated by the instruction decoder) and data indicating which instructions have executed (e.g., by tracking each instruction and/or maintaining a count of a number of memory store instructions that have issued). When all of the input operands and predicate(s) for a particular decoded instruction are ready, and any previously-ordered memory access instructions (e.g., previously ordered memory store instructions) have issued and/or executed, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions associated with generated load store identifiers (LSIDs), the execution order will also follow the priorities enumerated in the generated instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include a load/store queue 275, which can be used to issue memory instructions, a data cache 277, which stores data being input to or output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block). In some examples, data indicating relative ordering and execution status is used to determine whether the instruction block can be committed.

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
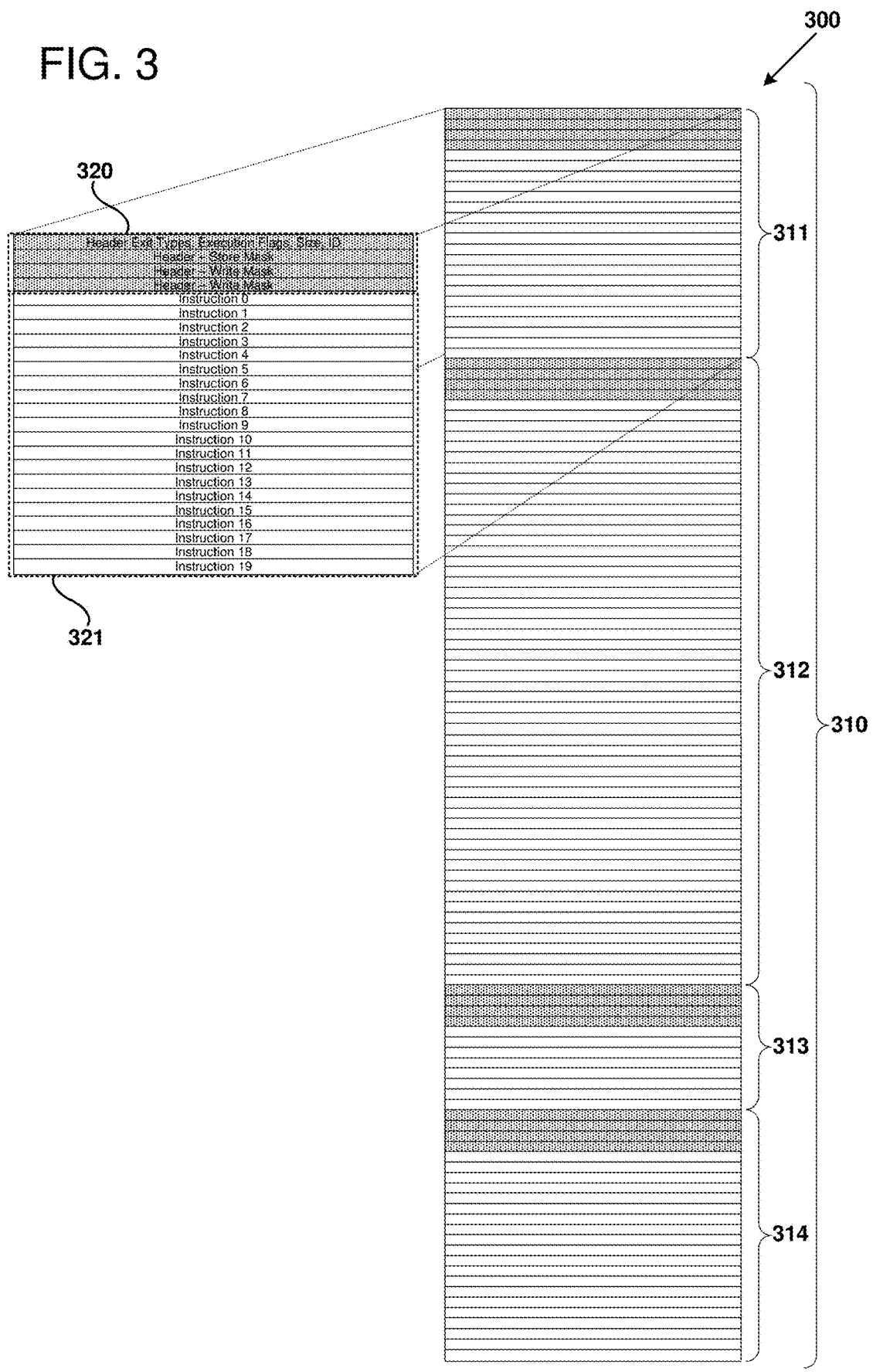
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. The instruction block header can also include a write mask, which identifies which global register(s) the associated instruction block will write. In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can generate load store identifiers for instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and data regarding memory access instructions stored in a hardware structure, such as a store instruction data store 207. In some examples, the store instruction data store 207 is not architecturally visible. In some examples, access to the store instruction data store 207 is configured to be limited to processor operation in a supervisory mode or other protected mode of the processor.

VI. Example Block Instruction Target Encoding

Figure 4:
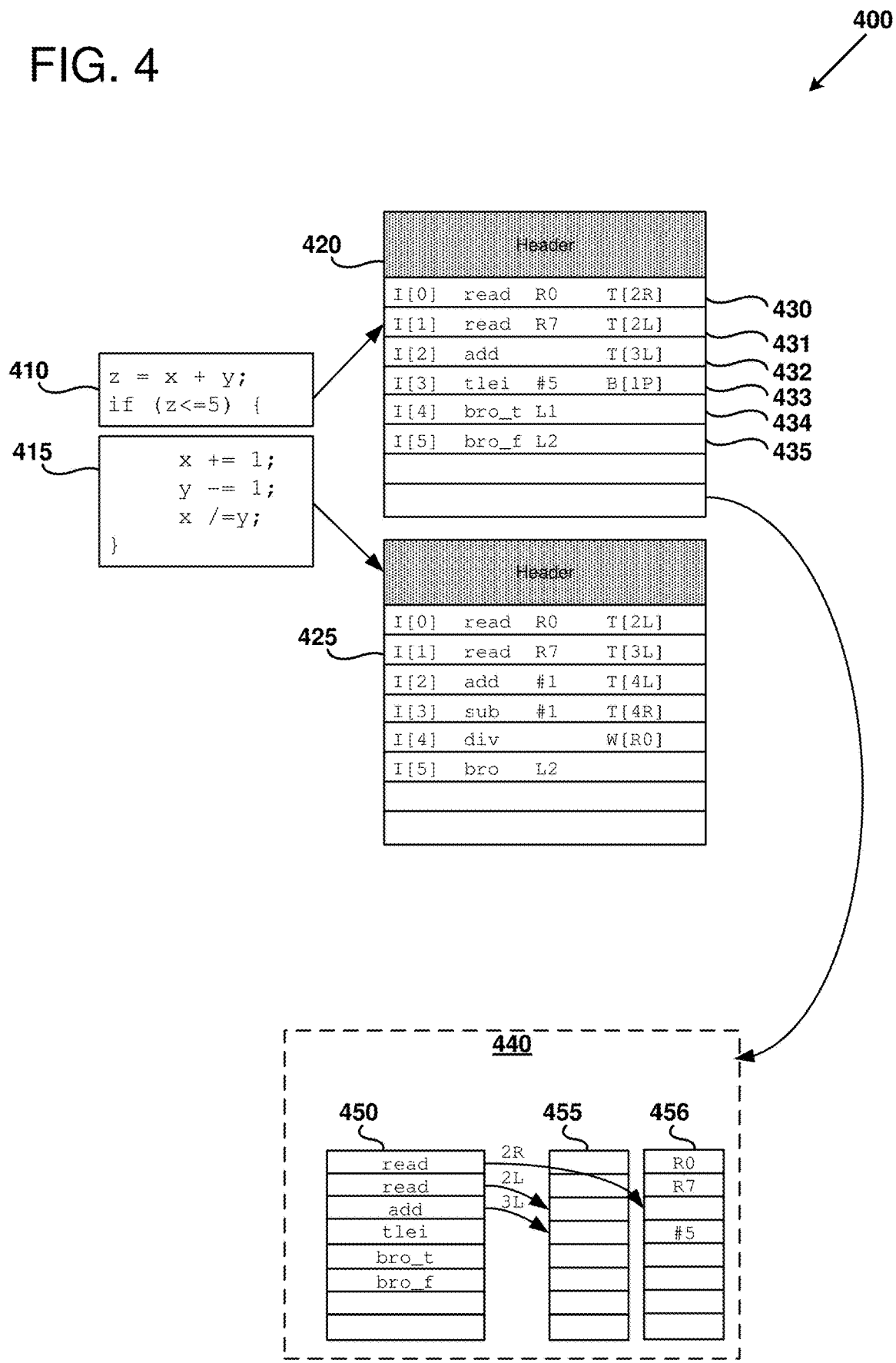
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 230); however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (1sb) (bit 0) up to its most significant bit (msb) (bit 127). As shown, the instruction header includes a write mask field, number of exit type fields, a number of execution flag fields, an instruction block size field, and an instruction header ID bit (the least significant bit of the instruction header). In some examples, the instruction header 510 includes by memory access instruction metadata 515, which stores data that can be used to generate relative ordering of memory access instructions in the instruction block, for example, predicate tree size, number of store instructions, or other suitable data. In some examples, the instruction header does not include a store mask field or memory access instruction metadata, as the data can be generated dynamically when the instruction block is decoded. In some examples, the memory access instruction metadata is stored as a fixed length field, while in other examples, the metadata is stored as a variable length field.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory).

VIII. Example Processor State Diagram

Figure 6:
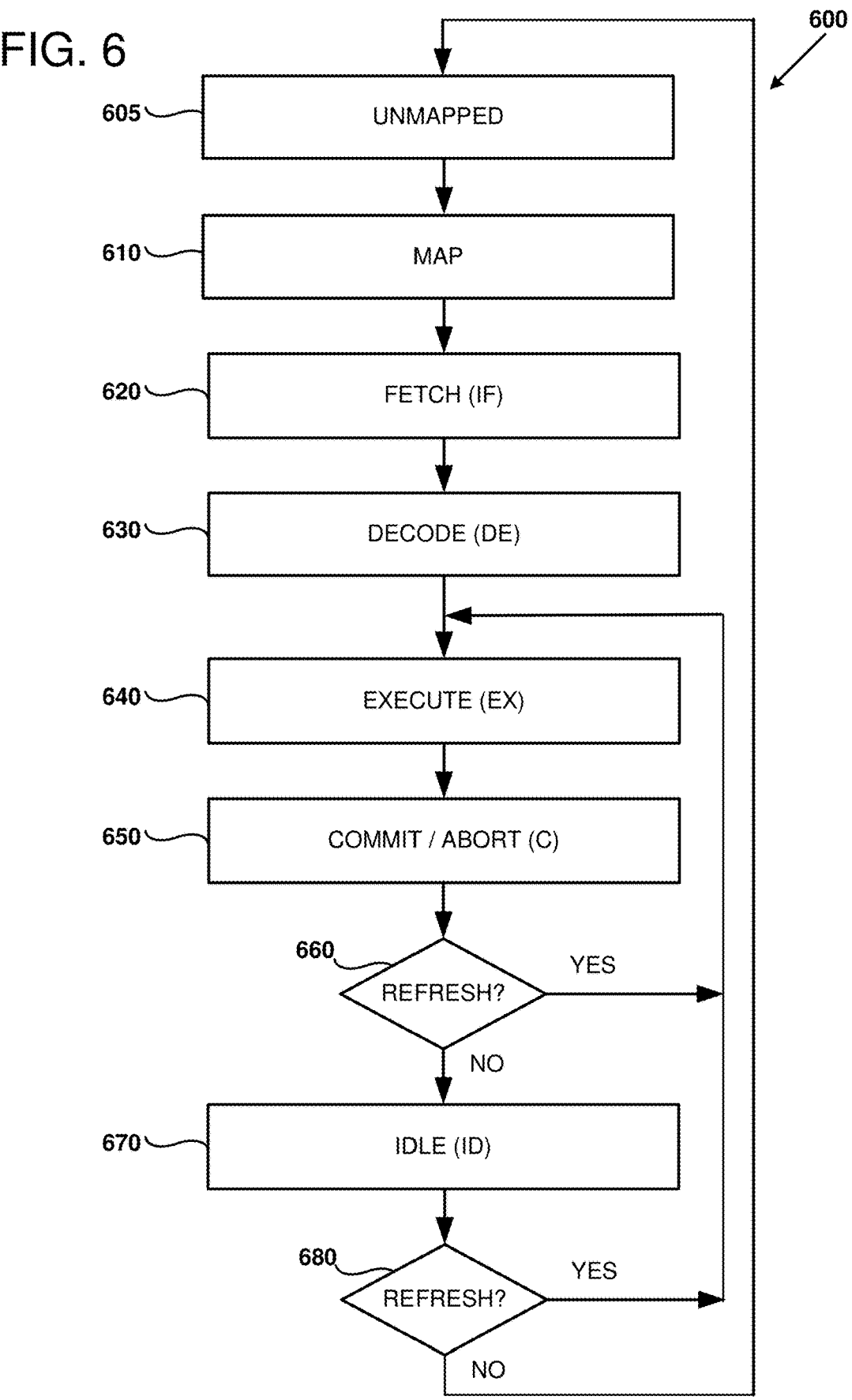
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction, including generation of identifiers indicating relative ordering of memory access instructions. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block.

At the commit/abort state 650, the processor core control unit determines that operations performed by the instruction block can be completed. For example memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

Figure 7:
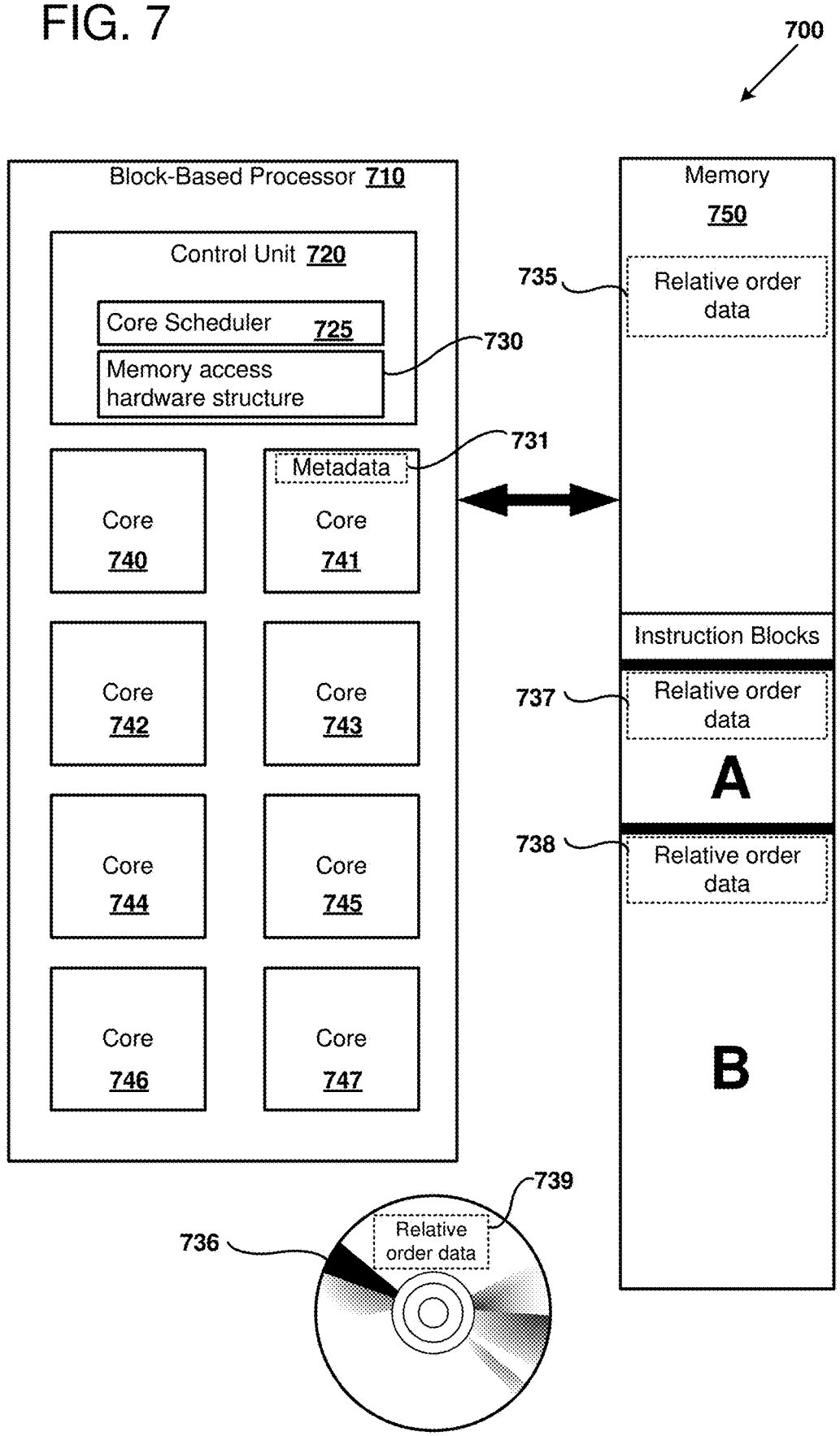
FIG. 7 illustrates a number of instructions blocks and processor cores, as can be used in some examples of the disclosed technology.

FIG. 7 is a diagram 700 illustrating an apparatus comprising a block-based processor 710, including a control unit 720 configured to execute instruction blocks according to data for one or more operation modes. The control unit 720 includes a core scheduler 725 and a memory access hardware structure 730. The core scheduler 725 schedules the flow of instructions including allocation and de-allocation of cores for performing instruction processing, control of input data and output data between any of the cores, register files, memory interfaces and/or I/O interfaces. The memory access hardware structure 730 stores metadata 731 including, for example, LSIDs, store mask data, store vector register data indicating which instructions have executed, mask store vector data, store counters, and/or any other suitable control flow data. The memory access hardware structure 730 can be implemented using any suitable technology, including SRAM, registers (e.g., including arrays of flip-flops or latches), or other suitable memory technology. The store mask can be generated when decoding instructions by the control unit 720. In some examples, relative order data such as store counts, store masks, and/or LSIDs previously generated by an instruction decoder from for one or more instruction blocks is read from a memory 750 (relative order data 735), including with previously-executed instruction blocks (e.g., relative order data 737 and 738), or in a computer-readable storage medium, such as a storage media disc 736 (e.g., in a data file 739).

The block-based processor 710 also includes one or more processor cores 740-747 configured to fetch and execute instruction blocks. The illustrated block-based processor 710 has up to eight cores, but in other examples there could be 64, 512, 1024, or other numbers of block-based processor cores. The block-based processor 710 is coupled to a memory 750 which includes a number of instruction blocks, including instruction blocks A and B, and to a computer-readable storage media disc 736.

Figure 8:
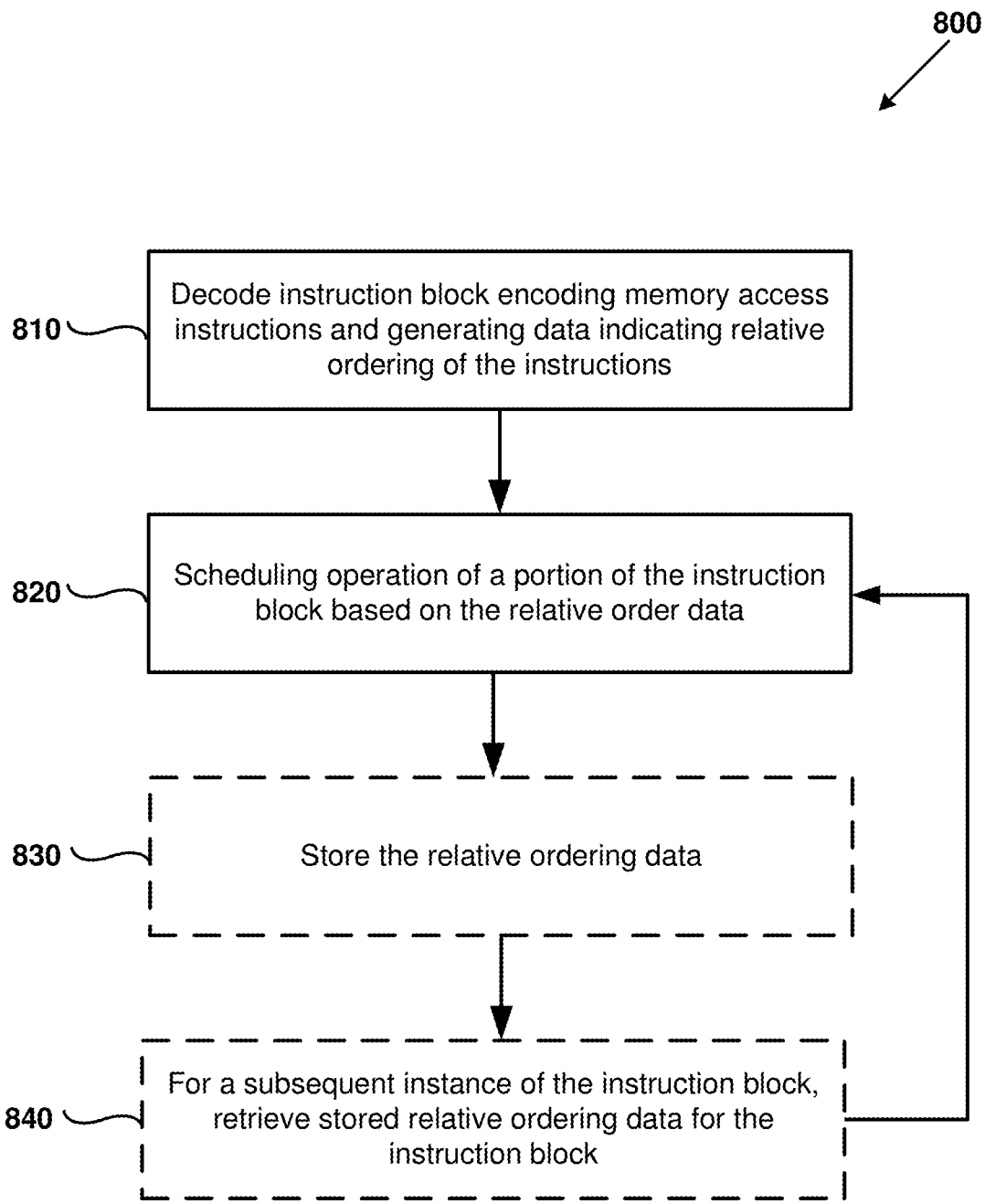
FIG. 8 is a flowchart outlining an example method of ordering instructions in an instruction block, as can be performed in certain examples of the disclosed technology.

X. Example Method of Scheduling Operation of an Instruction Block with Generated Relative Ordering Data FIG. 8 is a flowchart 800 outlining an example method of generating data indicating relative ordering of memory access instructions, as can be performed in certain examples of the disclosed technology. For example, the block-based processor 100 of FIG. 1, including the block-based processor core 111 described above in FIG. 2, can be used to perform the outlined method. In some examples, an instruction decode unit of a block-based processor is configured to generate the relative ordering data and store the data in a memory or register for use in subsequent instances of a particular instruction block and a control unit of the block-based processor is configured to control issuing of memory access instructions, including memory load and memory store instructions to an execution unit of the processor based, at least in part, on the relative ordering data.

At process block 810, an instruction block encoding memory access instructions is decoded, for example by instruction decoder 228 or 229, and data is generated indicating relative ordering of the instructions. For example, opcodes, memory targets, predicates, and other information encoded within instruction block instructions can be used to generate the data. In some examples, additional metadata can be stored with an instruction block in order to further enhance generation of the data. For example, by storing a count of the number of memory store instructions in an instruction block, and/or information about predicates within an instruction block, the relative ordering can be generated in a more efficient fashion (e.g., by requiring less processor hardware, by reducing instruction decode time, and/or by using less memory resources). In some examples, the relative ordering data can be stored as one or more tables in a memory storing block-based processor instructions. Examples of suitable data can include data regarding predicate paths for the instruction block, numbers of loads in the instruction block, numbers of stores in the instruction block, number of loads or stores along particular predicate paths, instruction identifiers (e.g., LSIDs) for the instruction block, as well as versions of this data combined in some fashion. In some examples, data can be generated for particular nodes in a control flow graph representing instruction flow within an instruction block, while in other examples, data can be associated with edges of such a control flow block. As will be readily understood to one of ordinary skill in the relevant art, alternative forms of expressing data in the illustrations depicted below can be employed in alternative embodiments.

At process block 820, operation of a portion of the instruction block is scheduled based on the relative ordering data. Thus, individual instructions within an instruction block can be issued and executed based on the generated relative ordering data in combination with data indicating the execution status of the currently-executing instruction block. For example, the relative ordering data can include relative identifiers that indicate an order in which memory store instructions must be executed. The control unit causes higher-ordered instructions to wait on lower-ordered memory instructions to issue and/or execute before proceeding with issuing the higher-ordered instructions. All or a portion of the instruction block can be scheduled using the relative ordering data, depending on the particular instructions encoded within the instruction block.

At process block 830, the relative ordering data that was generated at process block 810 is stored in a memory store. This memory store can be persisted between additional execution instances of an instruction block. Thus, the relative ordering data can be generated for a first instance of executing the instruction block, and then used for many subsequent instances of executing the same instruction block. After storing the relative ordering data, the method proceeds to process block 840.

At process block 840, for a subsequent instance of executing an instance of the instruction block, the stored relative ordering data is retrieved and used. Thus, the instruction decoder can save energy and time by not re-generating the relative ordering data for the instructions. After retrieving the relative ordering data, the method proceeds to process block 820 in order to schedule operation of at least a portion of the instruction block based on the retrieved relative ordering data.

The relative ordering data can be stored in any suitable hardware structure, such as the store instruction data store 207 discussed in further detail above. In some examples, the hardware structure can include a store mask, a content addressable memory (CAM) and/or a lookup table. In some examples, the control unit can include a stored vector register for storing data indicating which of the memory access instructions (e.g., as indicated by their instruction numbers, or LSIDS) that have executed. In some examples, a processor control unit is configured to prevent commitment of the instruction block, or delay execution of another instruction block until all of the memory stored instruction have executed. In some examples, the processor control unit includes a counter that is updated (e.g., incremented) when a memory load and/or a memory store instruction is executed and the instruction block, or particular memory access instructions within the instruction block are indicated to be completed when the counter reaches a predetermined value for that particular instruction. In some examples, the processor core is configured to execute predicated instructions, including predicated memory access instructions.

XI. Example Source and Object Code

FIG. 9 illustrates an example of source code 910 and corresponding assembly code 920 for a block-based processor, as can be used in certain examples of the disclosed technology. The source code 910 includes an if/else statement. Statements within each portion of the if/else statement include a number of memory reads and memory writes to arrays a[ ] and b[ ]. When the source code 910 is transformed to assembly code (and subsequently, machine code stored as object code), a number of load and store assembly instructions will be generated.

The assembly code 920 for the source code portion 910 includes 28 instructions numbered 0 through 27. The assembly instructions indicate a number of fields for example an instruction op code pneumonic, a source data specified by the instruction, for example, broadcast identifiers or immediate arguments, and target designations. The assembly code includes register read instructions (0-3), arithmetic instructions (e.g., instructions 3 and 4), and move instructions for sending data to multiple targets (e.g., move instructions 5 and 6). The assembly code 920 also includes a test instruction 11, which is a test if greater than instruction that will generate a predicate value on broadcast channel 2. Further, the assembly code includes two unpredicated memory load instructions 7 and 8, and predicated memory load instructions 16 and 23. The assembly code 920 also includes a number of memory store instructions, which will store data to a memory address, for example, predicated store instructions 12, 13, 18, and 26. As will be shown below, LSIDs can be generated by a decoder to indicate a relative ordering in which the memory access instructions are to be executed. For example, instructions 12 and 13 are dependent on load instructions 7 and 8 executing first. In some examples, two or more load store instructions can share an LSID. In some examples, the LSIDs are required by an instruction set architecture to be contiguous, while in other examples, the LSIDs can be sparse (e.g., intermediate LSID values are skipped). It should also be noted that in some examples, speculative or out-of-order execution of instructions in a block can be performed, but the processor must still maintain semantics as if the memory dependencies specified by the LSID was not violated.

The assembly code portion 920 can be converted to machine code for actual execution by a block-based processor.

XII. Example Control Flow Graph

Figure 10A:
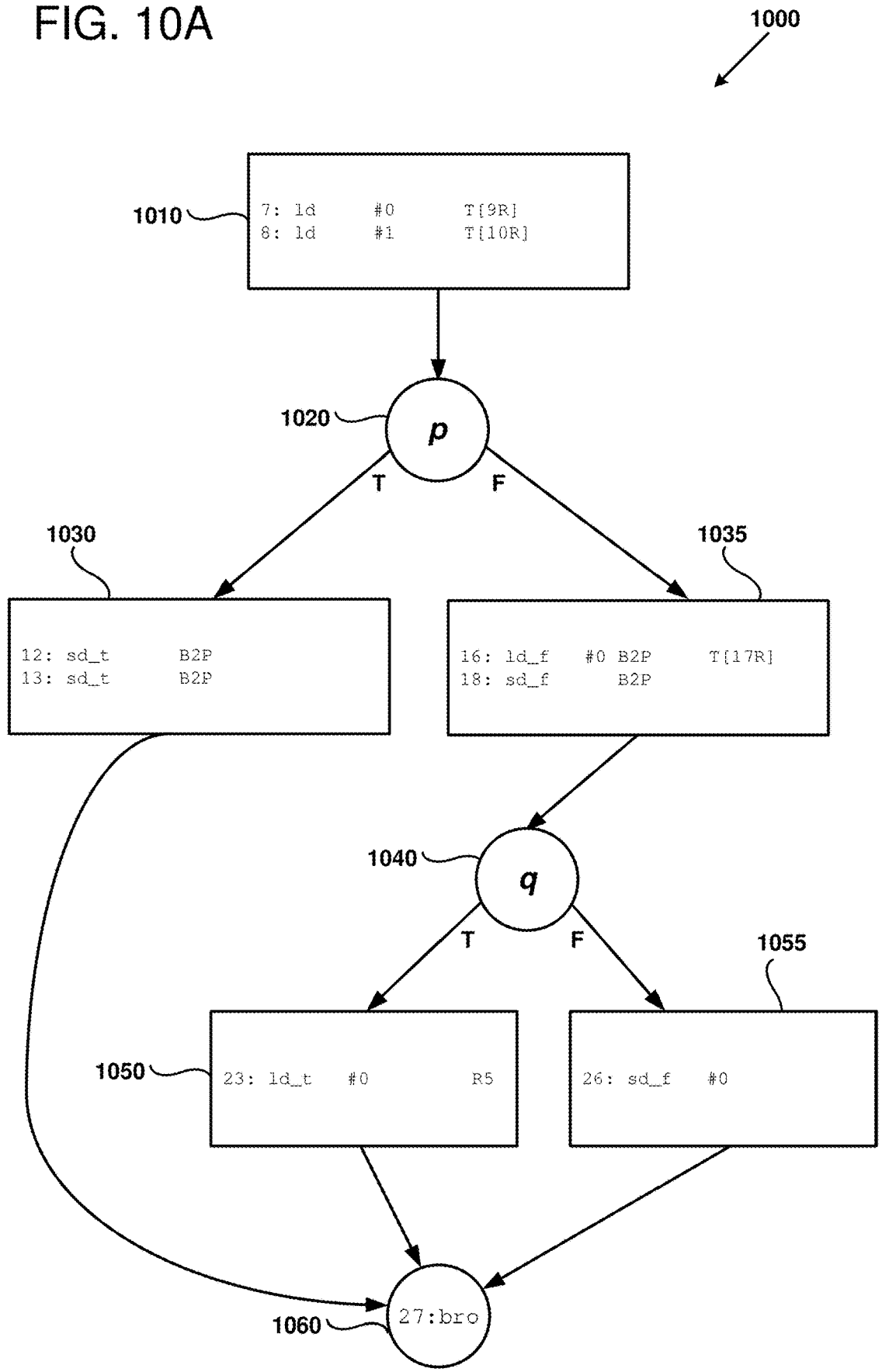
FIGS. 10A-C illustrate examples of graphs that can be used to order instructions in certain examples of the disclosed technology.

FIG. 10A illustrates a control flow graph 1000 generated for the assembly code 920 described above regarding FIG. 9. For example, an instruction decoder can generate data representing at least a portion of the dependencies illustrated in the control flow graph. The control flow graph 1000 is depicted in a graphical form for ease of illustration including nodes and edges, but can be represented in other forms, as will be readily apparent to one of ordinary skill in the relevant art. For ease of explanation, only load, store, and jump instructions from the assembly code 920 are shown in the control flow graph, but it should be understood that other instructions will be placed or referenced by nodes of the control flow graph according to each respective instruction's dependencies and predicates.

As shown, the source code portion 1010 includes load instructions 7 and 8, which are unpredicated and can thus issue and execute as soon as their operands are available. For example, assembly code move instruction 5 sends the memory address associated with a[i] to move instruction 5, which in turn sends the address to load instruction 7. Load instruction 7 can execute as soon as the address is available. Other instructions, such as read instructions 0 through 2, can also be executed without reference to a predicate.

Node 1020 is generated because of the conditional instruction 11, which generates a Boolean value by comparing two values (e.g., a test for one operand greater than another). If the left operand of the test instruction is larger than the predicate conditional value is true, and only instructions for code portion 1030 will execute. Conversely, if the conditional value is false, then the code portion 1035 will execute. In the disclosed block-based processor architecture, this can be performed without the use of branches or jumps because the associated instructions are predicated. For example, instruction 12 is a store instruction that is predicated on broadcast channel 2, which was generated by test instruction 11. Similarly, instruction 16 will execute only if the broadcast predicated value is false. As each of the instructions executes, a store vector and/or store counter is updated to indicate whether a store instruction has been executed.

Another node 1040 is generated because of conditional instruction 20, which itself is predicated on receiving a false condition from instruction 11. Source code portions 1050 (including load instruction 23) and 1055 (including store instruction 26) will executed conditioned on the predicated generated by instruction 20 being true or false, respectively.

The control flow graph 1000 also includes a join node 1060, which represents the transition back to statements contained outside of the if/else statement of the source code 910. In this example, this includes jump instruction 27, which will transfer control of the processor to the next instruction block. It should be noted that although the memory access instructions are executed according the generated relative ordering data (e.g., LSIDs and/or counter values), that the instructions will also wait for other dependencies before issuing.

Figure 10B:
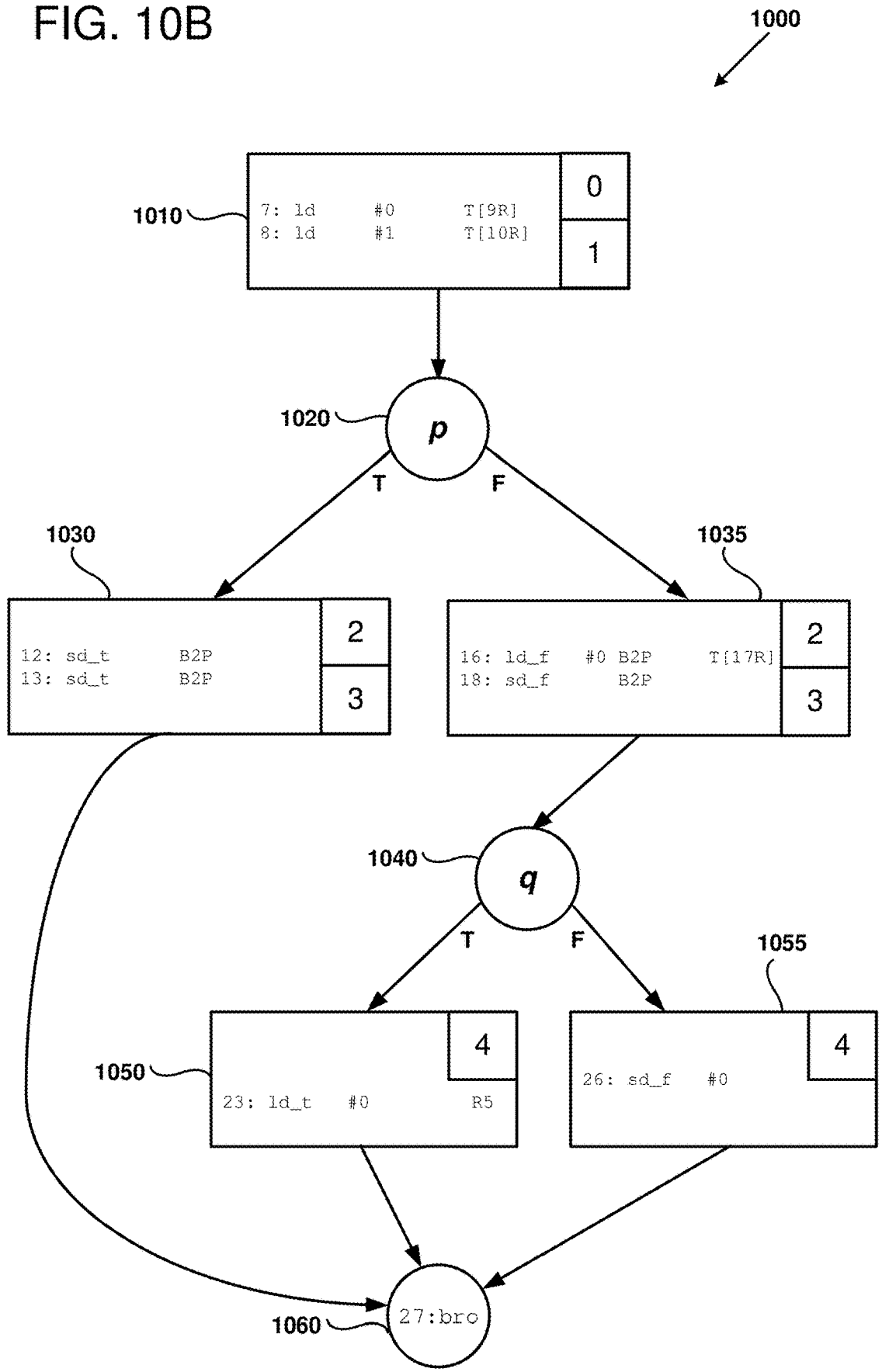

FIG. 10B illustrates an example of the control flow graph 1000 generated for the assembly code 920 after dynamically-generated identifiers indicating a relative ordering of memory access instructions have been generated. For example, the control flow graph illustrated in FIG. 10A can be further supplemented with LSIDs that indicate the relative ordering as shown. For example, the source code portion 1010 is assigned LSID value 0 (zero) for instruction number 7 and LSID value 1 for instruction number 8. LSIDs can be reused between different branches of a predicate path. For example, for predicate p, associated with node 1020, LSIDs values 2 and 3 are associated with both source code portion 1030 and source code portion 1035, since execution of the two source portions is mutually exclusive within a particular instance of the instruction block. In other examples, LSIDs are not shared between exclusive predicate paths.

Figure 10C:
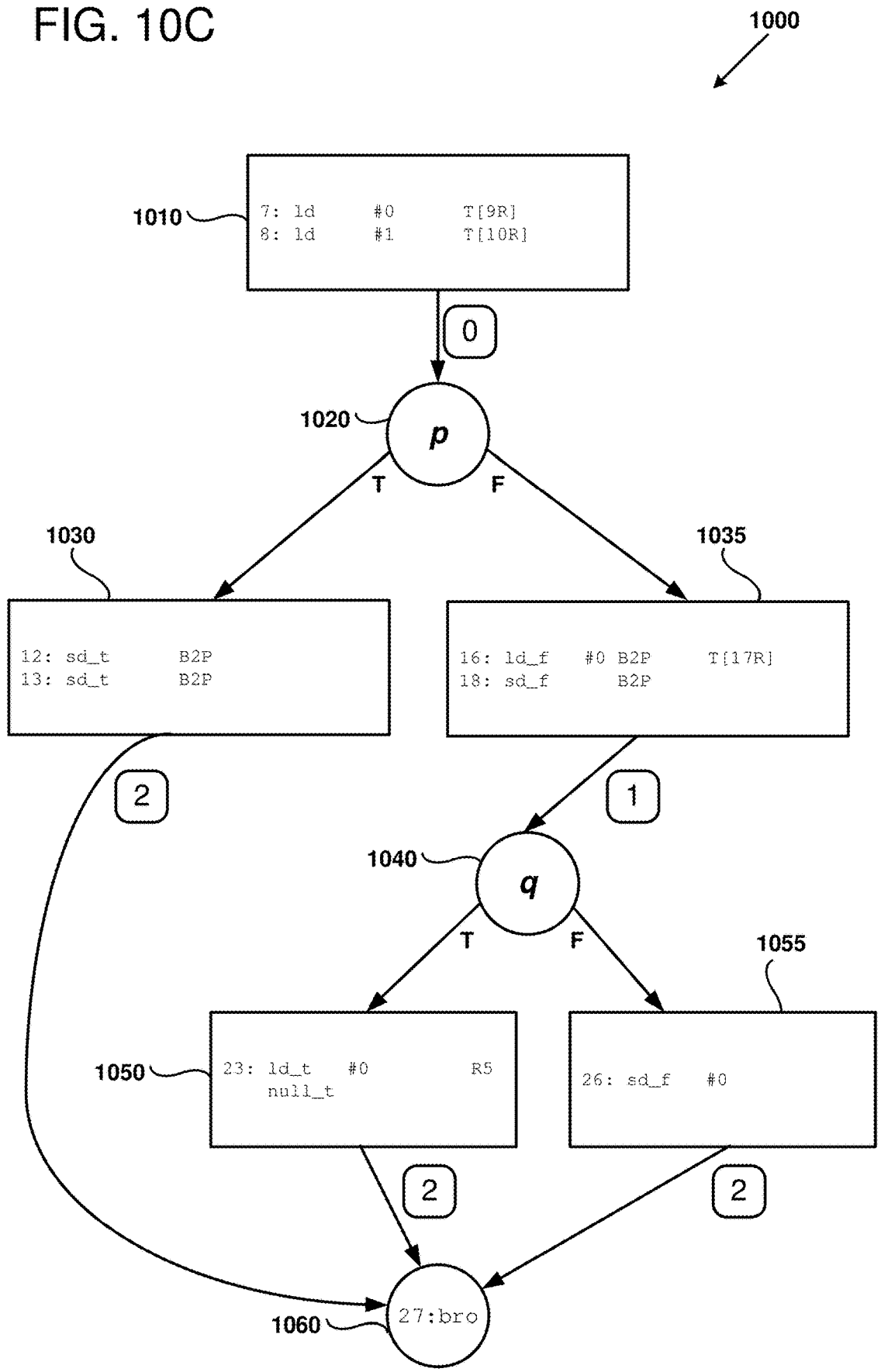

FIG. 10C illustrates an alternative example of relative ordering data for the control flow graph 1000 generated for the assembly code 920, where memory store counts have been added to the control flow graph and load store identifiers are not used. As shown, a number of edges of the control flow graph have been updated to indicate the number of memory store instructions that will have executed after the associated source code portion has been executed. For example, source code portion 1010 does not include any memory store instructions and, thus, the count is set to zero on the edge leaving the source code portion 1010. Source code portion 1030 includes two memory store instructions and, thus, the edge executing the source code portion node is set to a count of 2, while source code portion 1035 includes one memory store instruction, and so its edge is associated with a count of one. It should be noted that the edge counts in the illustrated example are cumulative from the start of the graph, but in other examples the count can be associated just with one portion of the source code. For example, source code portion 1055 includes one memory store instruction, but the memory store instruction count associated with its exiting edge is set to two, which is the cumulative number of memory store instructions that would be executed for that path through the control flow graph. Further, as shown, source code portion 1050 does not include a store instruction, but a null instruction has been inserted that will increment the memory store instruction count. This is used to balance the number of store instructions that appear to have been executed for each path through the control flow graph. Thus, at node 1060, the control unit hardware can determine whether the memory store instruction count has reached a single value, 2, before determining whether to execute the associated instructions. In some examples, a null instruction is generated and inserted into the instructions of an instruction block itself. In other examples, a store instruction is nullified by the processor core hardware such that it appears as if a memory store instruction has executed, but without storing an instruction in the instruction block. It should be readily understood to one of ordinary skill in the art that the relative ordering data can be represented and stored in a number of different fashions. For example, in various embodiments, instruction identifiers and/or store counts can be associated with nodes, edges, or individual instructions.

XIII. Examples of Data Representing Relative Ordering of Memory Access Instructions FIGS. 11 through 14 illustrate example arrangements of data representing relative ordering of memory access constructions as can be used in certain examples of the disclosed technology. For example, the data illustrated can be stored in a store instruction data store that can be accessed by a processor control unit and/or scheduler. The relative ordering data can be generated by an instruction decoder, using similar techniques to those discussed above regarding FIG. 2.

FIG. 11 illustrates an example table storing instruction identifiers and memory access information associated with a number of different predicate paths for the control flow graph of FIGS. 10A through 10C. As shown, each column is associated with a different path through the control flow graph for example always executed, predicate p taken, predicate p false, predicate p and q true (11), and so forth. In the instruction ID# row, the instruction identifiers associated with those instructions are stored. For example, instructions 7 and 8 will always execute regardless of the predicates in the instruction block. On the other hand, instructions numbers 12 and 13 will only execute if predicate p is true. Instruction number 23 will only execute if predicate p is false and predicate q is true. The last row indicates whether the associated instruction is a load or a store indicated by L or S, respectively. Thus, the relative ordering of the memory access instructions can be determined based on the predicates and their associated instruction identifiers. Predicate path 11 and 10 is marked with a dash because the predicate value q is a don't care condition if predicate p is true.

FIG. 12 illustrates a table encoding relative ordering information for the control flow graph of FIGS. 10A through 10C in a alternative format than shown in FIG. 11. As shown, each of the predicate paths is enumerated, but no don't care predicate paths are enumerated. Thus, the instruction identifier row will include duplicates for instructions 12 and 13 for predicate path 11 and 10, respectively. The table also includes information indicating whether the associated instruction is a load or store, as well as an additional row indicating the total number of store instructions that will be performed for each associated predicate path. Thus, as instructions are executed and predicates are resolved, a relative ordering of memory access instructions can be determined FIG. 13 illustrates an example table acting as a store vector register, as can be implemented in certain examples of the disclosed technology. The information in the store vector register can be compared to the relative ordering data in order to determine whether memory access instructions can be executed, and/or whether an instruction block is permitted to commit As shown, the table has 2 rows, 1 of which indicates a number of load and stores performed along each portion of the predicate path in the first row. Thus, for the source code portion 1010, there are 2 total load store instructions for predicate p taken, for source code portion 1030, there are 2 total load store instructions, while for source code portion 1035, there are 2 total load store instructions. The last row indicates the number of store instructions associated with the predicate paths. Thus, for source code portion 1030 there are 2 source store instructions, while for predicate path 00 there are 2 store instructions. Thus, an alternative manner of tracking execution of memory access instructions is disclosed.

FIG. 14 illustrates another example of data that can be stored in a store vector register as can be used in certain examples of the disclosed technology. In the register of FIG. 14, each column is associated with a particular memory access instruction identifier: 7, 8, 12, etc. Each row is associated with a particular predicate path for the control flow graph of FIG. 10A. Thus, a 1 bit indicates which instruction identifiers have store instructions that will execute depending on how the predicate conditions resolve. The last row is an OR mask that represents a logical OR of all rows for each column. Thus, this data can be used to track execution status and relative ordering of memory instructions as execution of an instruction block proceeds.

XIV. Example Store Mask/Store Vector Comparison

Figure 15A:
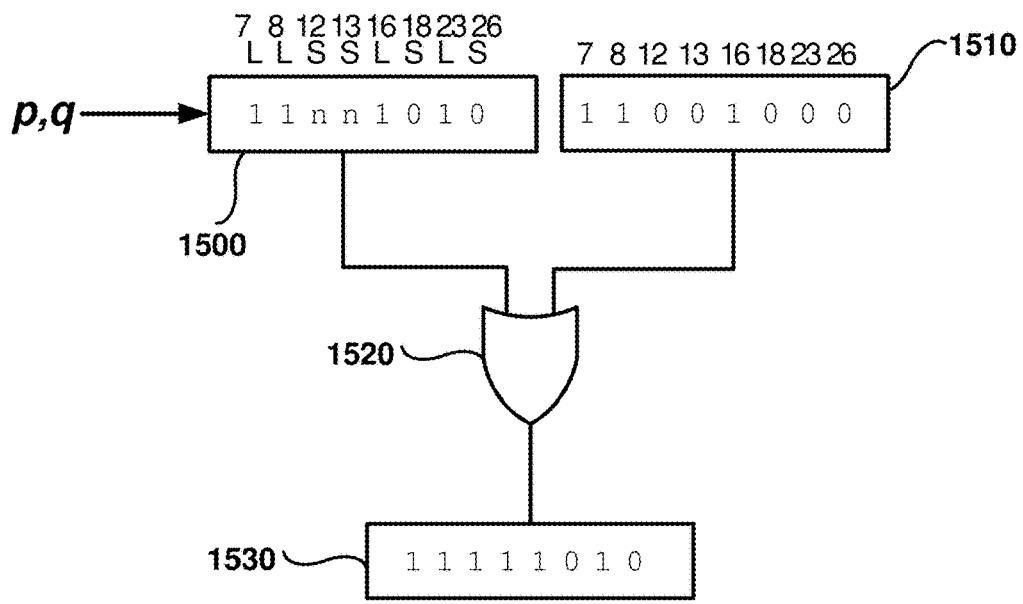
FIGS. 15A and 15B illustrate an example of using generated relative ordering data, as can be used in certain examples of the disclosed technology.
Figure 15B:
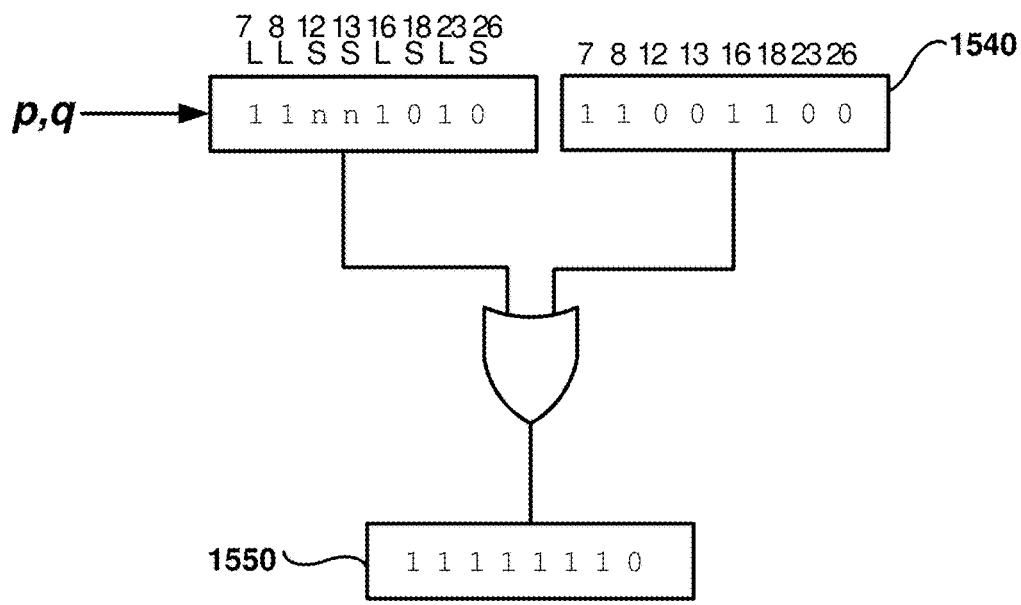

FIGS. 15A and 15B illustrate examples of comparing store masks to store vectors, as can be performed in certain examples of the disclosed technology. For example, as shown in FIG. 15A, a store mask 1500 stores 1, 0, or n values for the instruction IDs associated with the assembly code with the memory access instructions in the assembly code 920. Thus, instruction IDs 7, 8, 16, and 23 are associated with memory load instructions, while identifiers 12, 13, 18, and 26 are associated with memory store instructions. The store mask bit is set to 1 for load instructions, and set to 0 for store instructions. The store mask 1500 is updated using predicates p and q as they are generated when the instruction block is executed. Thus, the store mask 1500 shown is depicted after predicate p evaluates to false, and so instruction identifiers 12 and 13 are set to n to indicate that the instructions will never be executed for this particular instance of the instruction block. The illustrated circuit also includes a store mask vector 1510 which is compared to the store mask 1500 using a comparison circuit 1520 to produce a masked store vector 1530. The store mask vector 1510 stores one bits for those instructions that have executed. Thus memory access instructions 7, 8, and 16 have executed. Thus, the store mask vector indicates that instruction 18, the first 0 in the store mask vector 1530 is free to issue next. In some examples, if the ordering of memory access instructions is to be preserved (e.g., to aid debugging or to ensure proper system operation) reordering of memory access instructions can be disabled using, for example, a flag setting in an instruction block header.

FIG. 15B illustrates an example of generating a masked store vector comparison after an additional number of the instructions have executed. As shown, the store mask vector 1540 has been updated to indicate that instruction 18 has executed. Thus the results of the OR logic comparison indicates sets the bit corresponding to instruction 18 to a 1 value, thus indicating that instruction 26 can now proceed to execute based on the generated relative ordering data.

Figure 16A:
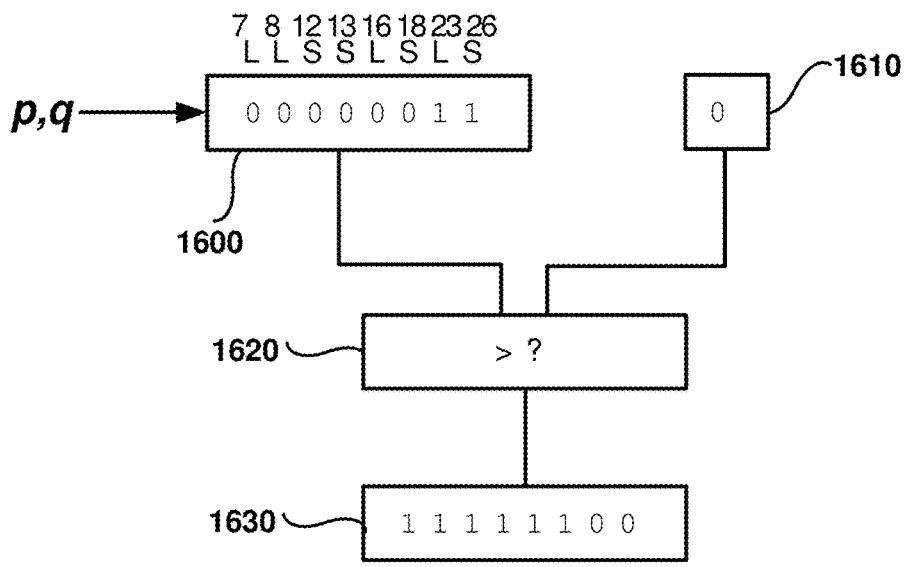
FIGS. 16A and 16B illustrate another example of using generated relative ordering data, as can be used in certain examples of the disclosed technology.
Figure 16B:
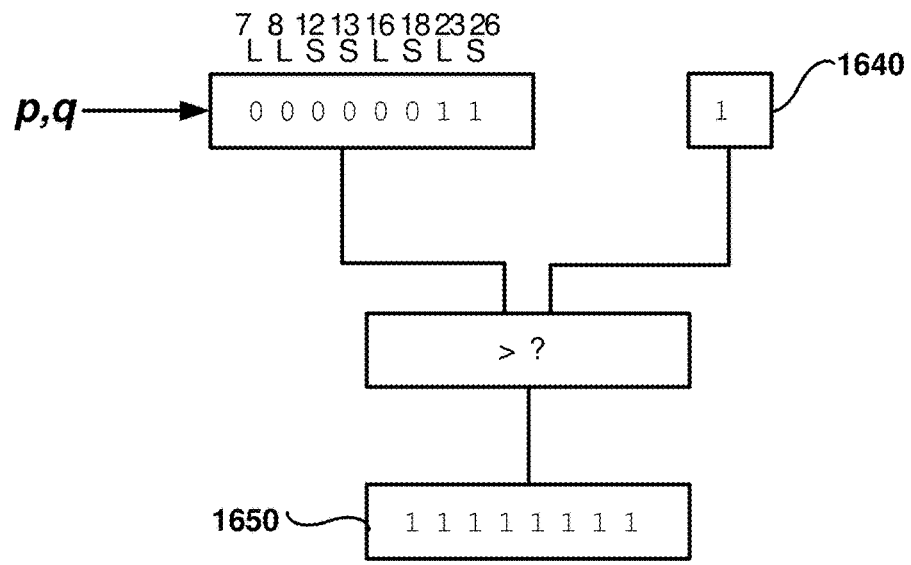

FIGS. 16A and 16B illustrate examples of comparing store masks using a store instruction counter, as can be performed in certain examples of the disclosed technology. Thus, a store counter can be used with, or instead of, the store mask vector discussed above regarding FIGS. 15A and 15B. As shown, the store mask 1600 stores a number of store instructions that are expected to be executed before a particular instruction is executed. Thus, instructions at 23 and 26 each expect that a single store instruction (store instruction 18) must be executed before either instruction 23 or instruction 26. A store instruction counter 1610 stores the total number of memory store instructions that have been executed at that point in time. Store instruction counter data and the store mask data are compared by a comparison circuit 1620 which compares the total number of store instructions that have executed to the store mask and outputs a masked store vector 1630 thus indicating which store instructions can be considered to have executed. In other examples, only memory store operations, but not memory load operations, are monitored by the circuit of FIG. 16A.

In some examples, a register is assigned to each instruction in the instruction block that maintains a count of how many store instructions precede the store instruction. A processor load/store queue can be used to buffer data generated for memory loads and stores until the instruction block commits, and then the memory operations are written to memory as part of the commit phase.

FIG. 16B illustrates the circuitry of FIG. 16A after a store instruction has executed. Thus, as shown, the store instruction counter 1640 has been increased to 1. The comparison circuit 1620 compares the store mask data to the counter and sets the masked store vector register 1650 to all 1 bits, indicating that any of the memory access instructions can now proceed to execute.

XV. Example Method of Transforming Code

Figure 17:
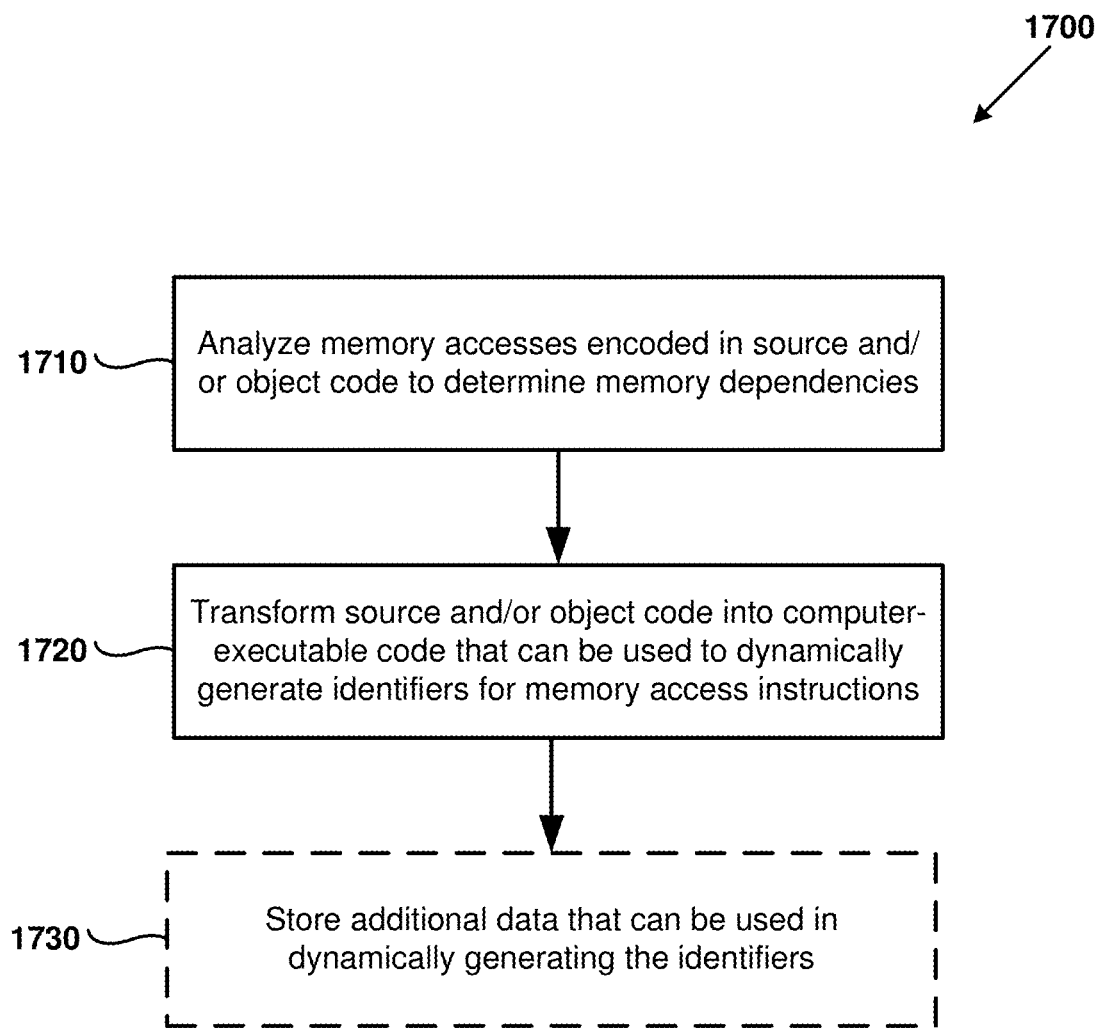
FIG. 17 is a flowchart outlining an example method of transforming source code and/or object code into block-based processor executable code, as can be performed in certain examples of the disclosed technology.

FIG. 17 is a flowchart 1700 outlining an example of transforming code into computer executable code for a block-based processor, as can be performed at certain examples of the disclosed technology. For example, a general purpose processor and/or a block-based processor can be used to implement the method outlined in FIG. 17. In some examples, the code is transformed by a compiler and stored as object code that can be executed by a block-based processor (e.g., block-based processor 100). In some examples, a just-in-time compiler or an interpreter generates computer-executable code at runtime.

At process block 1710, memory references encoded in source and/or object code are analyzed to determine memory dependencies. For example, the memory dependencies can simply be the order in which the memory access instructions are arranged in the program. In other examples, memory addresses that are likely to be written by memory access instructions can be analyzed to determine whether there are overlaps between load store instructions in an instruction block. In some examples, determining memory dependencies includes identifying two memory access instructions in the instruction block, a first one of the memory access instructions being predicated on a complementary condition of a second one of the memory access instructions, and, based on the identifying, determining a relative ordering for the first and second memory access instruction. After analyzing the memory references, the method proceeds to process block 1720.

At process block 1720, source code and/or object code are transformed into block-based computer executable code that can be used to dynamically generate identifiers for the memory access instructions indicating the relative ordering determined at process block 1710. In some examples, only memory access instructions are generated and stored but not metadata to assist in generating relative orders. In such cases, opcodes and predicates within an instruction block are assigned that can be used to generate relative ordering upon decoding of the instruction block.

At process block 1730, additional metadata, such as predicate tree information, a count of the number of store instructions in a block, or other information that can be used to generate relative instruction ordering is generated and stored with the instructions (e.g., in an instruction block header or footer). In some examples, a store mask is generated and stored as an instruction block header for the instruction block. In some examples, a special instruction is provided in order to load the data into memory of the control unit for use in, for example, masking the store vector. Once the code has been transformed into block-based processor code, it can be stored in a computer readable storage medium, or transmitted via a computer network to another location for execution by a block-based processor. In some examples, the generated code can include instruction that are used to generate program ordering dynamically, during execution of an instruction block, and save the data regarding order for subsequent invocations of the instruction block.

XVI. Exemplary Computing Environment

Figure 18:
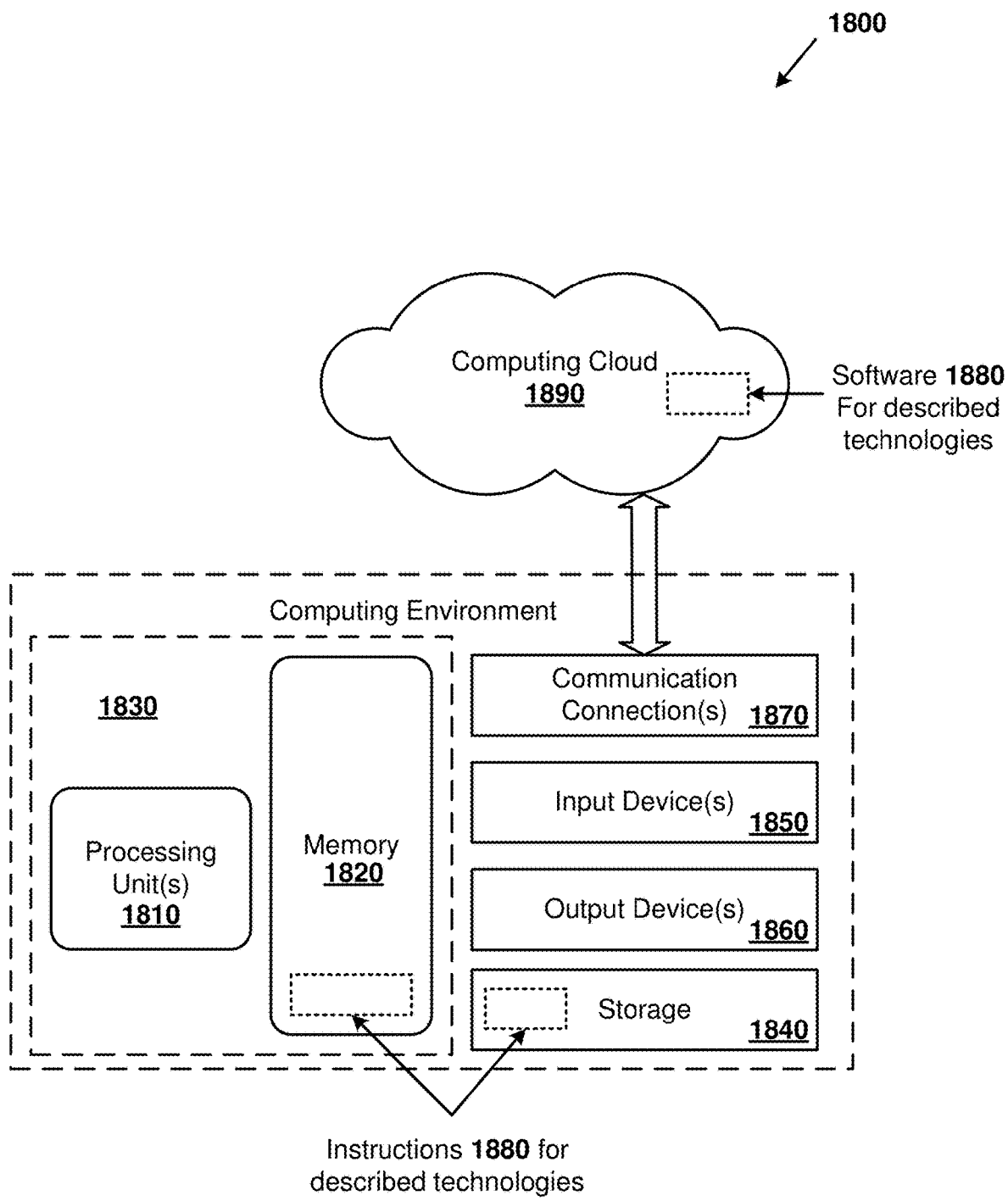
FIG. 18 is a block diagram illustrating a suitable computing environment for implementing some embodiments of the disclosed technology.

FIG. 18 illustrates a generalized example of a suitable computing environment 1800 in which described embodiments, techniques, and technologies, including configuring a block-based processor, can be implemented. For example, the computing environment 1800 can implement disclosed techniques for configuring a processor to generate relative ordering data for one or more instruction blocks, or compile code into computer-executable instructions for performing such operations, as described herein.

The computing environment 1800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 18, the computing environment 1800 includes at least one block-based processing unit 1810 and memory 1820. In FIG. 18, this most basic configuration 1830 is included within a dashed line. The block-based processing unit 1810 executes computer-executable instructions and may be a real or a virtual processor. In a multi-processing system, multiple processing units execute computer-executable instructions to increase processing power and as such, multiple processors can be running simultaneously. The memory 1820 may be volatile memory (e.g., registers, cache, RAM), non-volatile memory (e.g., ROM, EEPROM, flash memory, etc.), or some combination of the two. The memory 1820 stores software 1880, images, and video that can, for example, implement the technologies described herein. A computing environment may have additional features. For example, the computing environment 1800 includes storage 1840, one or more input device(s) 1850, one or more output device(s) 1860, and one or more communication connection(s) 1870. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store information and that can be accessed within the computing environment 1800. The storage 1840 stores instructions for the software 1880, plugin data, and messages, which can be used to implement technologies described herein.

The input device(s) 1850 may be a touch input device, such as a keyboard, keypad, mouse, touch screen display, pen, or trackball, a voice input device, a scanning device, or another device, that provides input to the computing environment 1800. For audio, the input device(s) 1850 may be a sound card or similar device that accepts audio input in analog or digital form, or a CD-ROM reader that provides audio samples to the computing environment 1800. The output device(s) 1860 may be a display, printer, speaker, CD-writer, or another device that provides output from the computing environment 1800.

The communication connection(s) 1870 enable communication over a communication medium (e.g., a connecting network) to another computing entity. The communication medium conveys information such as computer-executable instructions, compressed graphics information, video, or other data in a modulated data signal. The communication connection(s) 1870 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1890. For example, disclosed compilers and/or block-based-processor servers are located in the computing environment, or the disclosed compilers can be executed on servers located in the computing cloud 1890. In some examples, the disclosed compilers execute on traditional central processing units (e.g., RISC or CISC processors).

Computer-readable media are any available media that can be accessed within a computing environment 1800. By way of example, and not limitation, with the computing environment 1800, computer-readable media include memory 1820 and/or storage 1840. As should be readily understood, the term computer-readable storage media includes the media for data storage such as memory 1820 and storage 1840, and not transmission media such as modulated data signals.

XVII. Additional Examples of the Disclosed Technology

Additional examples of the disclosed subject matter are discussed herein in accordance with the examples discussed above.

In some examples of the disclosed technology, an apparatus includes memory and one or more block-based processor cores, at least one of the cores including an instruction decoder configured to generate identifiers indicating a relative ordering for a plurality of memory access instruction decoded from an instruction block, and a control unit configured to issue memory access instructions in the instruction block based at least in part on using at least one of the generated identifiers to determine that all memory access instructions to be executed for the instruction block have executed.

In some examples, one or more of the cores further includes a load/store queue that uses the generated identifiers to determine whether to issue one or more of the memory access instructions. In some examples, the instruction decoder is further configured to generate a store mask for each of two or more predicated execution paths of the decoded instruction block, the store mask indicating which of the identifiers are associated with a designated type of memory access instruction. In some examples, the control unit is further configured to commit the instruction block by comparing the generated identifiers for memory access instructions that have executed to the store mask for a taken one of the predicated execution paths. In some examples, the control unit is further to execute the memory access instructions according to an ordering specified by the generated identifiers. In some examples, the instruction decoder is further configured to generate a store count for each of two or more predicated execution paths of the decoded instruction block, each store count indicating a number of store instructions performed for a respective one of the predicated execution paths. In some examples, the generated identifiers are stored in a cache for use by subsequent instances of the instruction block.

In some examples, the processor cores further include a store instruction data store, and the control unit is further configured to store data in the store instruction data store indicating which of the memory access instructions have executed and based on the data stored in the store instruction data store, commit the instruction block.

In some examples, the apparatus further includes computer-readable storage media storing data for an instruction block header and for memory access instructions in the instruction block.

In some examples of the disclosed technology, method of operating a processor to execute an instruction block including a plurality of memory load and/or memory store instructions includes the acts of decoding an instruction block encoding a plurality of memory access instructions and generating data indicating a relative order for executing the memory access instructions in the instruction block and scheduling operation of a portion of the instruction block based at least in part on the relative order data. In some examples, the relative order data includes a load store identifier (LSID) for one or more of the memory access instructions. In some examples, the decoding includes storing the relative order data is stored in a memory, and the method further includes, for a subsequent instance of the instruction block, retrieving the stored relative ordering data for the instruction block, and executing the instruction block a second time, the executing comprising scheduling operation of a portion of the instruction block based at least in part on the stored relative order data. In some examples, the scheduling includes determining whether an instruction of the instruction block can execute and/or whether the instruction block can commit based at least in part on one or more of the generated identifiers. In some examples, the memory access instructions are not encoded with LSIDs. In some examples, the decoding further includes, for a predicated execution path of the plurality of memory access instructions, determining a number of memory access instructions executed when the predicated execution path is taken.

In some examples, the method further includes executing the instructions for the instruction block according to a first or a second predicated execution path, and the executing includes counting a number of load and/or store instructions executed, and the method further includes comparing the number of load and/or store instructions executed to the determined number of memory access instructions.

In some examples, the determined number is a first number and the predicated execution path is a first execution path, and the decoding further comprises determining a second number of memory access instructions executed for the second execution path of the plurality of memory instructions, and if the first number of instructions is not equal to the second number of memory instructions, inserting one or more null instructions to the predicated execution path having a lesser number of instructions.

In some examples, the decoding further includes decoding store count, a flag that indicates whether memory ordering must be enforced for the block, predicate path, and/or store mask information from an instruction header of the instruction block. In some examples the method further includes generating a store mask for each of two more or more predicate paths of the instruction block, combining the store masks to generate a store mask for the instruction block, comparing the combined store mask to a store mask for a taken predicate path, and based on the comparing, determine one or more LSIDs to nullify, wherein the scheduling takes into account the nullified LSIDs as if an associated instruction had executed.

In some examples of the disclosed apparatus and methods, a store mask is generated for all predicate paths. In some examples, a store count is generated for all predicate paths, and the store count is also used to determine when to commit the instruction block. In some examples, the store instruction data store is a register or memory, and a valid bit is associated with each store.

In some examples, the selecting is further based on comparing a counter value indicating a number of the memory load and/or memory store instructions that have executed to an identifier encoded in the selected next instruction. In some examples the LSIDs are not densely encoded. In some examples, the relative order is specified by one or more of the following: data encoded in the instruction block header, data encoded in one or more instructions of the instruction block, data encoded in a table generated dynamically upon decoding the instruction block, and/or cached data encoded during a previous execution of the instruction block.

In some examples of the disclosed technology, certain methods further include, based on a generated LSID for an executed instruction, updating a store vector to indicate that the instruction executed. In some examples of the disclosed technology, certain methods further include, based on the generated LSIDs, generating a store mask indicating which of the generated LSIDs are associated with memory store instructions, and based on the store mask, determining whether the instruction block can be committed. In some examples of the disclosed technology, certain methods further include, based on the generated LSIDs, generating a store mask indicating which of the generated LSIDs are associated with memory store instructions, and based on the store mask, determining whether a memory access instruction having a later-ordered LSID can execute.

In some examples of the disclosed technology, the instruction decoding further comprises, for a first instruction and a second instruction of the plurality of memory access instructions, determining that the first instruction is encoded to conditionally execute based on a predicate condition, determining that the second instruction is encoded to conditionally executed based on the complement of the predicate condition, where the generating the LSIDs assigns the same LSID to the first instruction and the second instruction.

In some examples of the disclosed technology, certain methods further include, decoding data from a header for the instruction block, the decoded data including at least one or more of the following data for the instruction block: predicate paths, store masks, and/or instruction numbers associated with memory access instructions. In some examples, the determined number of memory access instructions includes only the number of memory store instructions. In some examples, the data is encoded in a header field of an instruction block including the memory access instructions. In some examples, the comparing/combining includes logical OR-ing the store masks.

In some examples, instruction block header data can include encoding the predicate paths and/or store mask for those paths, header prefix bits, valid bits, and/or instruction numbers. In some examples, the generated identifiers are stored in an cache (e.g., an instruction cache, a header cache, an LSID cache, or other form of cache) for use by subsequent instances of the instruction block. In some examples, the generated identifiers can be cached or stored in a computer readable storage media for subsequent invocations of the block.

In some examples of the disclosed technology, a method of generating object code for a block-based processor includes analyzing memory accesses encoded in source code and/or object code to determine memory dependencies for the instruction block, and transforming the source code and/or object code into computer-executable code for the instruction block, the computer-executable code including memory access instructions that can be used to generate identifiers indicating a relative ordering of the memory access instructions.

In some examples, the method further includes storing additional data not part of the memory access instructions with the computer-executable code, the additional data being usable by an instruction decoder to dynamically generate the identifiers. In some examples, the data includes at least one or more of the following: an indication of the number of memory access instruction in the instruction block, an indication of a number of stores in the instruction block, or an indication of the location of a memory access instructions. In some examples, at least one of the memory access instructions are predicated, and the data includes an indication of one or more predicate paths in the instruction block.

In some examples of the disclosed technology, computer-readable storage media storing computer-readable instructions for an instruction block that when executed by a processor, cause the processor to perform any one or more of the methods disclosed herein.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising memory and one or more processor cores coupled thereto, at least one of the one or more processor cores comprising:
   an instruction decoder configured to:
      decode control flow for a group of instructions, the control flow including a plurality of predicate paths, each of the predicate paths being associated with a different combination of conditions generated by a respective predicated instruction in the group of instructions; and generate and store, in a multi-dimensional table in memory, data indicating a relative ordering for a plurality of memory access instructions decoded from the group of instructions, the relative ordering associating each of the plurality of memory access instructions with a respective one or more of the plurality of predicate paths which, when taken, will cause the associated memory access instruction to execute;

a store vector register configured to store data indicating which one or more of the plurality of memory access instructions have executed and which one or more other instructions of the plurality of memory access instructions have not executed; and a control unit configured to inhibit issue of a given memory access instruction in the group of instructions by:

retrieving, from the multi-dimensional table, the data indicating the relative ordering, according to an instant path of the predicate paths;

comparing (a) the data stored in the store vector register indicating which of the plurality of instructions have executed to (b) the relative ordering indicated by the retrieved data; and not issue the given memory access instruction until the comparing indicates that all instructions prior to the given memory access instruction have executed.

2. The apparatus of claim 1, further comprising a load/store queue that uses the generated data to determine whether to issue one or more of the memory access instructions.

3. The apparatus of claim 1, wherein the data indicating the relative ordering comprises a store mask, and wherein the instruction decoder is further configured to generate the store mask for each of two or more predicated execution paths of the decoded group of instructions, the store mask indicating which of the group of instructions are associated with a designated type of memory access instruction.

4. The apparatus of claim 3, wherein the control unit is further configured to commit the group of instructions by comparing the generated data for memory access instructions that have executed to the store mask for a taken one of the predicated execution paths.

5. The apparatus of claim 1, wherein the control unit is further configured to execute the memory access instructions according to an ordering specified by the generated data.

6. The apparatus of claim 1, wherein the instruction decoder is further configured to generate a store count for each of two or more predicated execution paths of the decoded group of instructions, each store count indicating a number of store instructions performed for a respective one of the predicated execution paths.

7. The apparatus of claim 1, further comprising:
a store instruction data store, wherein the control unit is further configured to:
store data in the store instruction data store indicating which of the memory access instructions have executed; and
based on the data stored in the store instruction data store, commit the group of instructions.

8. The apparatus of claim 1, wherein the store vector register stores data indicating the total number of store instructions that will be performed for each associated predicate path.

9. The apparatus of claim 1, wherein the data stored in the store vector register comprises a plurality of data items for respective instructions of the plurality of memory access instructions.

10. The apparatus of claim 1, wherein the data stored in the multi-dimensional table indicates a number of load instructions, a number of store instructions, or a number of load and store instructions that will be executed if the respective predicate path is taken.

11. A method of operating a processor, the method comprising:

decoding a plurality of predicated memory access instructions, each of the memory access instructions being encoded with a respective predicate field value required to be matched by a corresponding predicate condition so that the respective memory access instruction will be executed, the memory access instructions not being encoded with load/store identifiers (LSIDs);

based on the decoding, generating and storing relative order data indicating a relative order for executing the memory access instructions, the relative order data associating a respective instruction identifier for each of the plurality of memory access instructions with a predicate path determined by the predicate conditions of the memory access instructions;

storing the relative order data in a multi-dimensional table;

retrieving the relative order data from the multi-dimensional table, according to an instant predicate path; and scheduling execution of the memory access instructions according to the relative order data.

12. The method of claim 11, wherein the decoding comprises storing the relative order data in a memory, and wherein the method further comprises, for a subsequent execution of the memory access instructions:

retrieving the stored relative order data for the memory access instructions; and executing the memory access instructions a second time, the executing comprising scheduling operation of a portion of the memory access instructions based at least in part on the stored relative order data.

13. The method of claim 11, wherein the scheduling comprises determining whether an instruction of the memory access instructions can execute and/or whether the memory access instructions can commit based at least in part on the relative order data.

14. The method of claim 11, wherein the decoding further comprises, for a predicated execution path of the plurality of memory access instructions:

determining a number of memory access instructions executed when the predicated execution path is taken.

15. The method of claim 11, further comprising:
executing the memory access instructions according to a predicated execution path, wherein the executing includes determining a number of the memory access instructions executed; and
comparing a number of load and/or store instructions executed to the determined number of memory access instructions.

16. The method of claim 15, wherein the number is a first number of memory access instructions and the predicated execution path is a first predicated execution path, and wherein the decoding further comprises:
determining a second number of memory access instructions executed for a second execution path of the plurality of memory instructions; and if the first number of memory access instructions is not equal to the second number of memory access instructions, inserting one or more null instructions to the predicated execution path having a lesser number of instructions.

17. The method of claim 11, wherein the decoding further comprises decoding store count, a flag that indicates whether memory ordering must be enforced for the memory access instructions, predicate path and/or store mask information from an instruction header of the memory access instructions.

18. The method of claim 11, wherein the method further comprises:
- generating a store mask for each of two more or more predicate paths of the memory access instructions;
- combining the store masks to generate a combined store mask for the memory access instructions;
- comparing the combined store mask to a store mask for a taken predicate path; and
- based on the comparing, determine one or more LSIDs to nullify, wherein the scheduling takes into account the nullified LSIDs as if an associated instruction had executed.

19. The method of claim 11, wherein the relative order data comprises store mask data indicating whether an instruction is a load instruction or a store instruction, the method further comprising:
- storing the store mask data in a register; and
- with a comparison circuit, comparing the store mask data in the register to a store mask vector to produce a masked store vector, wherein the scheduling execution is based on the masked store vector.

20. The method of claim 11, wherein the relative order data indicates how many of the memory access instructions are store instructions, the method further comprising:
- updating a store instruction counter to indicate a number of store instructions of memory access instructions have executed; and
- with a comparison circuit, comparing the store instruction counter to the relative order data, wherein the scheduling execution is based on the comparing.

21. The method of claim 11, wherein the scheduling execution comprises:
- comparing the relative order data to data stored in a store vector register, wherein the data stored in the stored vector register indicates which one or more of the memory access instructions have executed and which one or more other instructions of the memory access instructions have not executed.

22. One or more computer-readable storage media storing computer-readable instructions that, when executed by a processor, cause the processor to perform a method, the computer-readable instructions comprising:
- first instructions for analyzing memory accesses encoded in source code and/or object code to determine memory dependencies for the encoded memory accesses; and
- second instructions for transforming the source code and/or object code into computer-executable code, the computer-executable code including:
- predicated memory access instructions encoded without load/store identifiers, each of the memory access instructions encoded with a respective predicate field value required to be matched by a corresponding predicate condition so that the respective memory access instruction will be executed, each of the memory access instructions specifying a respective memory address to or from which the respective memory access instruction reads or writes data, and
- additional data not encoded within the memory access instructions, the additional data stored in a multi-dimensional table and comprising for each predicate path in a group of the memory access instructions, a count of the number of store instructions in the group of the memory access instructions in the computer-executable code.

23. The computer-readable storage media of claim 22, wherein the additional data includes at least one or more of: an indication of a number of memory access instruction in the group of the memory access instructions, or an indication of the location of a given memory access instruction.

24. The computer-readable storage media of claim 22, wherein:
- at least one of the memory access instructions are predicated; and
- the data includes an indication of one or more predicate paths in the group of the memory access instructions.

* * * * *